(12) United States Patent
Washisu

(10) Patent No.: US 8,218,018 B2
(45) Date of Patent: Jul. 10, 2012

(54) OPTICAL APPARATUS

(75) Inventor: Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 12/566,346

(22) Filed: Sep. 24, 2009

(65) Prior Publication Data

US 2010/0079604 A1    Apr. 1, 2010

(30) Foreign Application Priority Data

Sep. 29, 2008   (JP) ................................. 2008-251673

(51) Int. Cl.
*H04N 5/228* (2006.01)
(52) U.S. Cl. .............. 348/208.7; 348/208.4; 348/208.99
(58) Field of Classification Search ............. 348/99, 348/208.1–208.99; 396/52–55
See application file for complete search history.

(56) References Cited

U.S. PATENT DOCUMENTS

| | | | | |
|---|---|---|---|---|
| 5,847,874 A * | 12/1998 | Sasao et al. ................. | 359/554 |
| 7,162,152 B2 * | 1/2007 | Akabane et al. .............. | 396/87 |
| 7,551,970 B2 * | 6/2009 | Stommen et al. ............. | 700/61 |
| 2006/0227220 A1 * | 10/2006 | Kondo et al. ............. | 348/208.1 |
| 2006/0279638 A1 * | 12/2006 | Matsuda et al. ........... | 348/208.7 |
| 2007/0257989 A1 * | 11/2007 | Shirono .................... | 348/208.99 |
| 2007/0263996 A1 * | 11/2007 | Iwasaki et al. .................. | 396/55 |
| 2007/0279497 A1 * | 12/2007 | Wada et al. ................ | 348/208.7 |
| 2008/0031605 A1 * | 2/2008 | Akada et al. ..................... | 396/55 |
| 2008/0055421 A1 * | 3/2008 | Kimura .................... | 348/208.99 |
| 2008/0129830 A1 * | 6/2008 | Inoue et al. ................. | 348/208.2 |
| 2008/0151065 A1 | 6/2008 | Okumura et al. | |
| 2009/0002502 A1 * | 1/2009 | Shirono .................... | 348/208.99 |
| 2009/0097834 A1 * | 4/2009 | Jang et al. ....................... | 396/55 |
| 2010/0079908 A1 * | 4/2010 | Heidmann .................... | 360/110 |
| 2010/0309324 A1 * | 12/2010 | Shirono .................... | 348/208.11 |

FOREIGN PATENT DOCUMENTS

CN    1162753 A    10/1997

(Continued)

OTHER PUBLICATIONS

The above references were cited in a Feb. 11, 2011 Chinese Office Action, which is enclosed with English Translation, that issued in Chinese Patent Application No. 200910177194.1.

(Continued)

*Primary Examiner* — Aung S Moe
*Assistant Examiner* — Chia-Wei A Chen
(74) *Attorney, Agent, or Firm* — Cowan, Liebowitz & Latman, P.C.

(57) ABSTRACT

An optical apparatus includes a lens frame 12 which holds a focus correction lens 11a and is movable in an optical axis direction, optical axis direction position detectors 19a to 19c which are arranged on one of the lens frame 12 and a supporting portion 13 inside a barrel and detect signals in accordance with a distance to the other one, driving portions 112a to 112c and coils 17a to 17c (driver) which drive the lens frame 12 in the optical axis direction, an optical axis direction movement limiting member of the lens frame, and a lens CPU 1204 (controller) which controls the driver so as to suppress a tilt of the focus correction lens 11a based on a signal detected by the optical axis direction position detectors 19a to 19c whose sensitivities have been calibrated in association with the driving portions and the optical axis direction movement limiting member.

12 Claims, 23 Drawing Sheets

A-A CROSS SECTION

FOREIGN PATENT DOCUMENTS

| | | |
|---|---|---|
| CN | 2359663 A | 1/2000 |
| CN | 101158742 A1 | 4/2008 |
| CN | 101207718 A | 6/2008 |
| JP | 05-066336 | 3/1993 |
| JP | 07-248522 | 9/1995 |

OTHER PUBLICATIONS

The above reference was cited in a Jul. 29, 2011 Chinese Office Action, which is enclosed with an English Translation, that issued in Chinese Patent Application No. 200910177194.1.

* cited by examiner

A-A CROSS SECTION

A-A CROSS SECTION

OPTICAL APPARATUS

BACKGROUND OF THE INVENTION

1. Field of the Invention

The present invention relates to an optical apparatus, and more particularly to an optical apparatus capable of stably performing a high-speed lens drive.

2. Description of the Related Art

As a technology of moving a lens with high speed and low noise to perform a focusing, as disclosed in Japanese Patent Laid-open No. 5-066336, a technology where a permanent magnet is arranged at a lens side and a coil is arranged at a fixed portion side to drive the lens by direct driving has been known. In this technology, the lens is guided by a guide axis along an optical axis and a lens frame slides on the guide axis to perform lens driving in an optical axis direction.

However, in such a structure, due to a sliding friction on the guide axis, a high-speed lens driving can not be performed. Further, there is a problem that a sliding noise is generated by the sliding friction, or the like.

As a lens driving method for performing a high-speed focusing in order to solve the problem, as disclosed in Japanese Patent Laid-open No. 7-248522, a proposal in which a lens is electromagnetically levitated to electromagnetically drive the lens in an optical axis direction has been made.

An optical apparatus disclosed in Japanese Patent Laid-open No. 7-248522 performs lens driving without providing a sliding portion. Therefore, a high-speed focusing can be performed.

However, since the lens of this optical apparatus is floated and supported by an electromagnetic force, the tilt of the lens with respect to an optical axis is unstable at a lens position other than a position where a coil finally contacts a magnet in an optical axis direction. For example, the tilt of the lens may be changed in accordance with the change of the gravity depending on the attitude of a camera. Further, there is a possibility that the lens is tilted by a behavior of the lens during a focusing operation.

In an optical apparatus of using a TV-AF method (contrast detecting method), as a method for detecting a front focus and a rear focus of an object, a method called wobbling is used. In the wobbling method, a lens is vibrated at high frequency in an optical axis direction to evaluate an image obtained at each position to determine whether or not it is the front focus or the rear focus based on a focusing state of each image. In this case, because the lens vibrates with high speed, the lens is easily tilted in accordance with the vibration mode and there is a possibility that a false image evaluation may be performed.

BRIEF SUMMARY OF THE INVENTION

The present invention provides an optical apparatus capable of stably realizing a high-speed lens drive.

An optical apparatus as one aspect of the present invention comprises a moving frame configured to hold one of a lens and an image pickup device and to be movable in an imaging optical axis direction, a plurality of detectors arranged at one of the moving frame and a fixed portion inside an imaging apparatus and configured to detect signals in accordance with a distance to the other one, each of the plurality of detectors being configured to detect a displacement in the imaging optical axis direction, and a plurality of drivers configured to drive the moving frame in the imaging optical axis direction.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

[Embodiment 1]

First, embodiment 1 of the present invention will be described.

Figure 1:
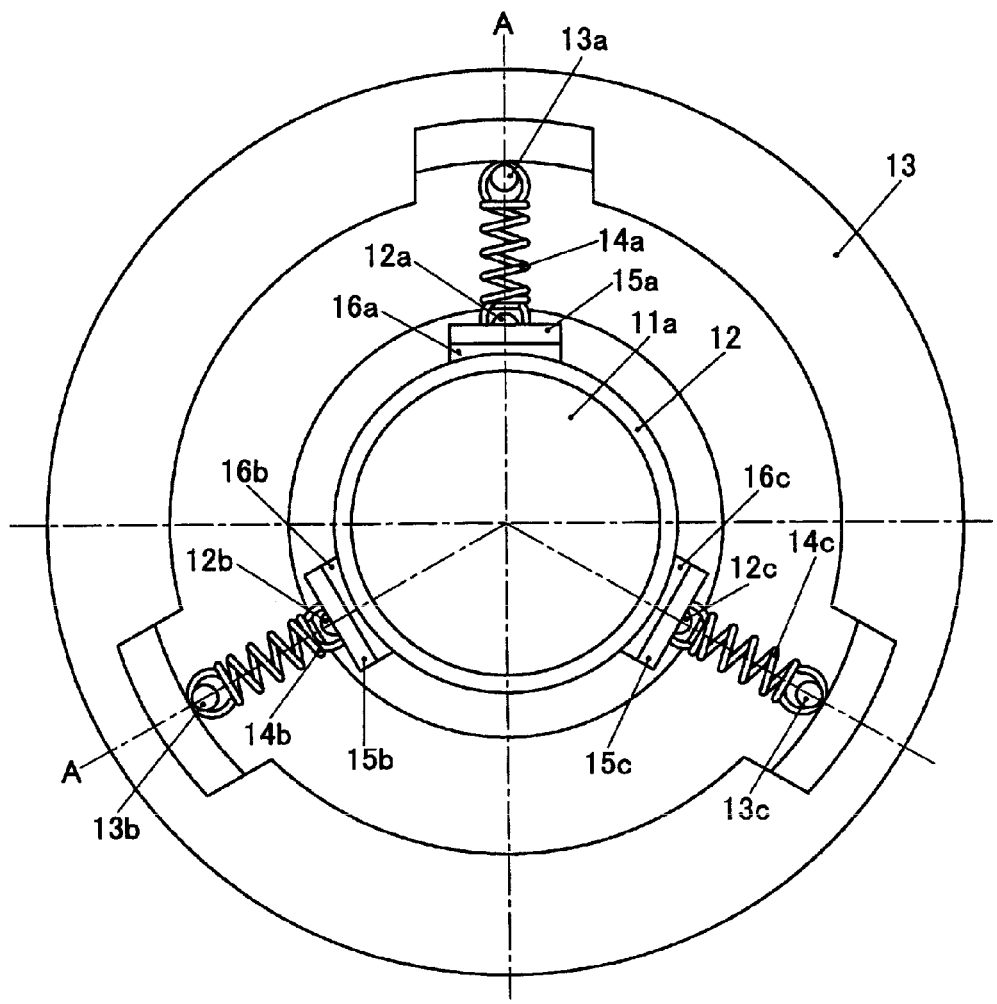
FIG. 1 is a plan view of an optical apparatus in embodiment 1.
Figure 2:
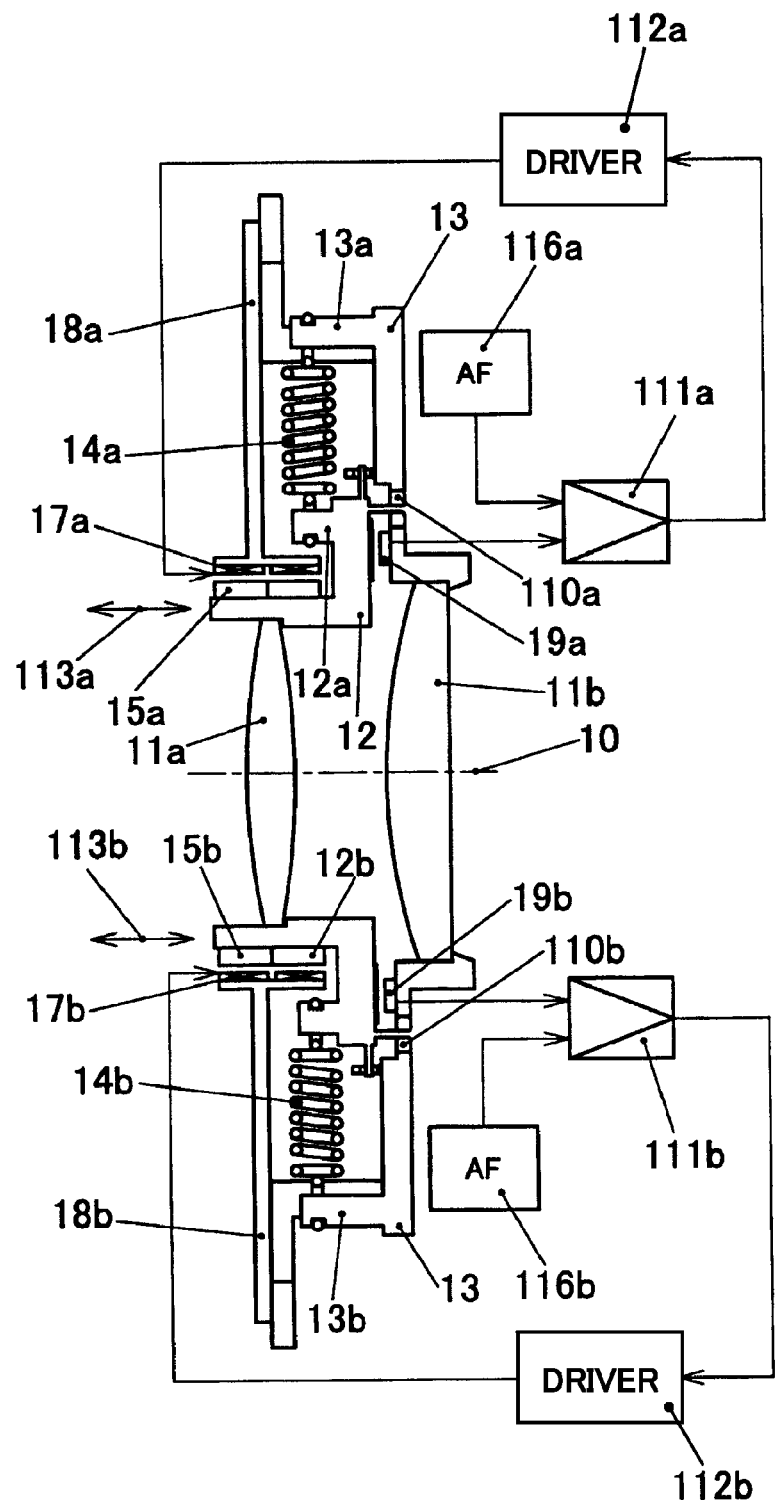
FIG. 2 is a cross-sectional view of an optical apparatus in embodiment 1.

FIG. 1 is a plan view of an optical apparatus in the present embodiment. FIG. 2 is a cross-sectional view of A-A section in FIG. 1.

Figure 3:
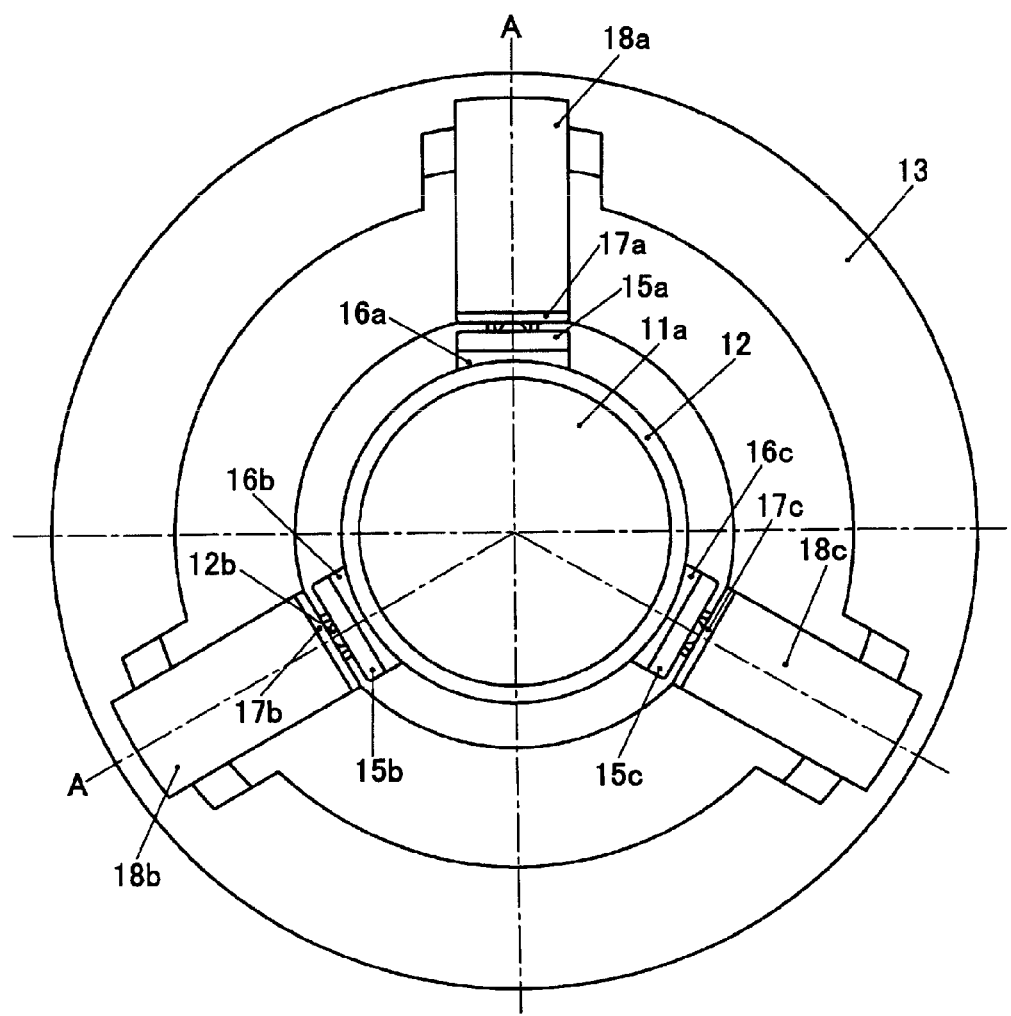
FIG. 3 is a plan view of an optical apparatus in embodiment 1.

In FIG. 1, coils 17a to 17c and coil holders 18a to 18c described later are omitted. FIG. 3 is an elevation view showing the optical apparatus of the present embodiment, including the coils 17a to 17c and the coil holders 18a to 18c.

In FIGS. 1 to 3, reference numeral 11a denotes a focus correction lens which is provided on a lens frame 12 that is a moving frame. Reference numeral 11b denotes a fixed lens which is provided on a supporting portion 13 (a fixed portion). As shown in FIG. 2, the focus correction lens 11a and the fixed lens 11b are arranged in a direction of an optical axis 10 that is an imaging optical axis. The lens frame 12 holds the focus correction lens 11a and is configured to be movable in the imaging optical axis direction (optical axis direction).

Elastic devices 14a to 14c which are formed by three tension coil springs provided in radiation directions which differ by 120 degrees from one another, are hooked between hook pins 12a to 12c of the lens frame 12 and hook pins 13a to 13c of the supporting portion 13, respectively. The lens frame 12 is elastically supported for the supporting portion 13 by elastic forces of the elastic devices 14a to 14c. The supporting portion 13 is fixed on a lens barrel (not shown) of the optical apparatus. The focus correction lens 11a and the fixed lens 11b which are provided inside the lens barrel constitute an imaging optical system in combination with other lens groups provided inside the lens barrel.

Permanent magnets 15a to 15c are provided on the lens frame 12 via yokes 16a to 16c in radiation directions which differ by 120 degrees from one another, respectively. Coil holders 18a to 18c which are provided in radiation directions which differ by 120 degrees from one another, respectively, are fixed on the supporting portion 13. The coil holders 18a to 18c support coils 17a to 17c, respectively.

The coils 17a to 17c constitute an optical axis direction driver (a plurality of drivers) in combination with the permanent magnets 15a to 15c and the yokes 16a to 16c. When applying electric current to the coils 17a to 17c, a force acts on the lens frame 12 by a magnetic field generated by the permanent magnets 15a to 15c. Thus, the optical axis direction driver can drive the lens frame 12 in a direction (optical axis direction) indicated by arrows 113a to 113c (reference numeral 113c is not shown)

Optical axis direction position detectors 19a to 19c (a plurality of detectors) which detect a relative position (displacement) between the lens frame 12 and the supporting portion 13 are provided on the supporting portion 13. In the present embodiment, the optical axis direction position detectors 19a to 19c are arranged on the supporting portion 13, but the present invention is not limited to this. The optical axis direction position detectors 19a to 19c may be arranged on the lens frame 12. Thus, the optical axis direction detectors 19a to 19c are arranged at one of the lens frame 12 and the supporting portion 13 inside the lens barrel, and detect signals in accordance with the distance to the other one.

As shown in FIG. 2, an output of the optical axis direction position detector 19a is inputted to a comparator 111a. The comparator 111a compares the output value of the optical axis direction position detector 19a with an output value from an AF sensor 116a. A driver 112a controls electric current applied to the coil 17a based on a comparison result by the comparator 111a. Each operation of the comparator 111a and the driver 112a is actually processed by a lens CPU 1204, and the details will be described later. Similarly, drivers 112b and 112c control electric current applied to the coils 17b and 17c.

Such a configuration enables the optical apparatus of the present embodiment to move the lens frame 12 in an optical axis direction and to perform a focusing and a shake correction with high accuracy.

Figure 4:
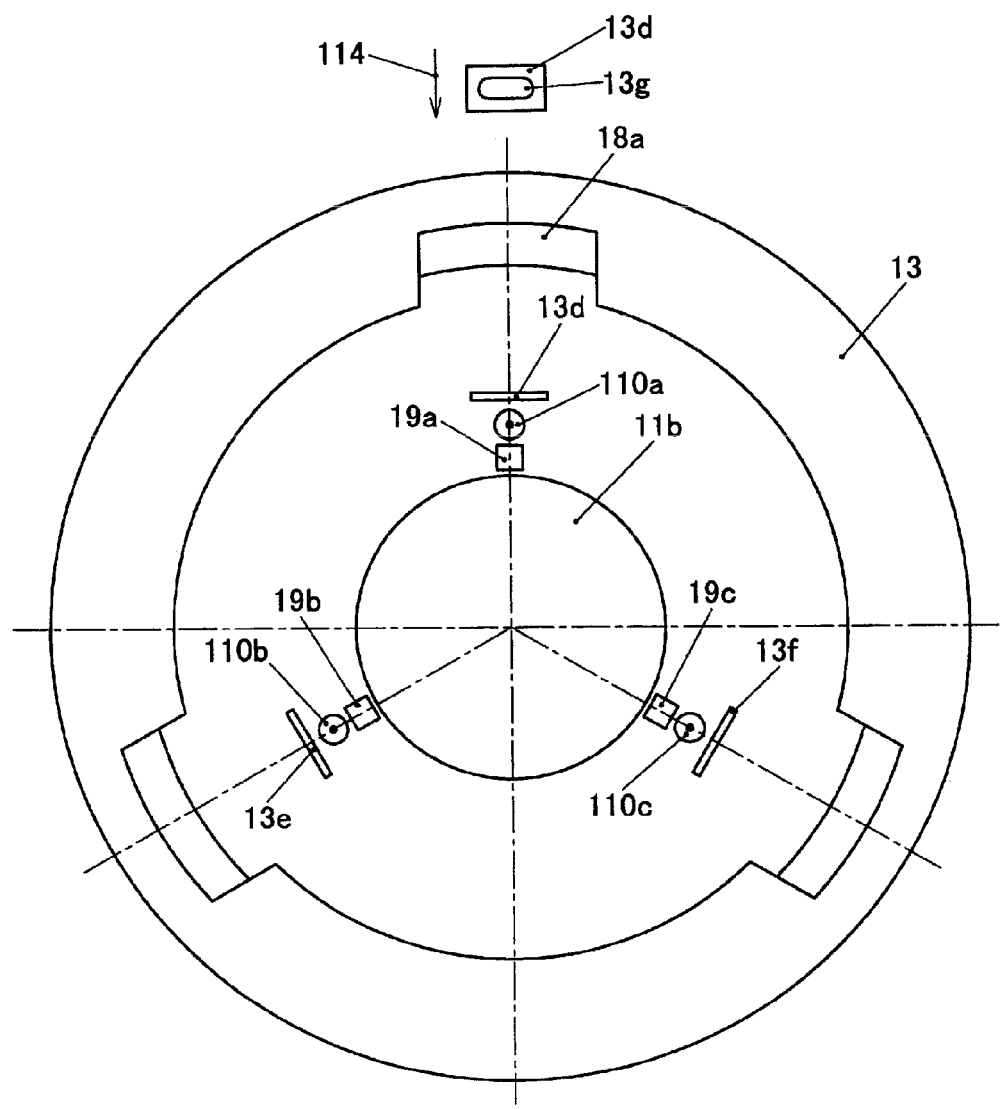
FIG. 4 is a plan view showing a supporting portion and each component provided at the supporting portion in an optical apparatus in embodiment 1.
Figure 5:
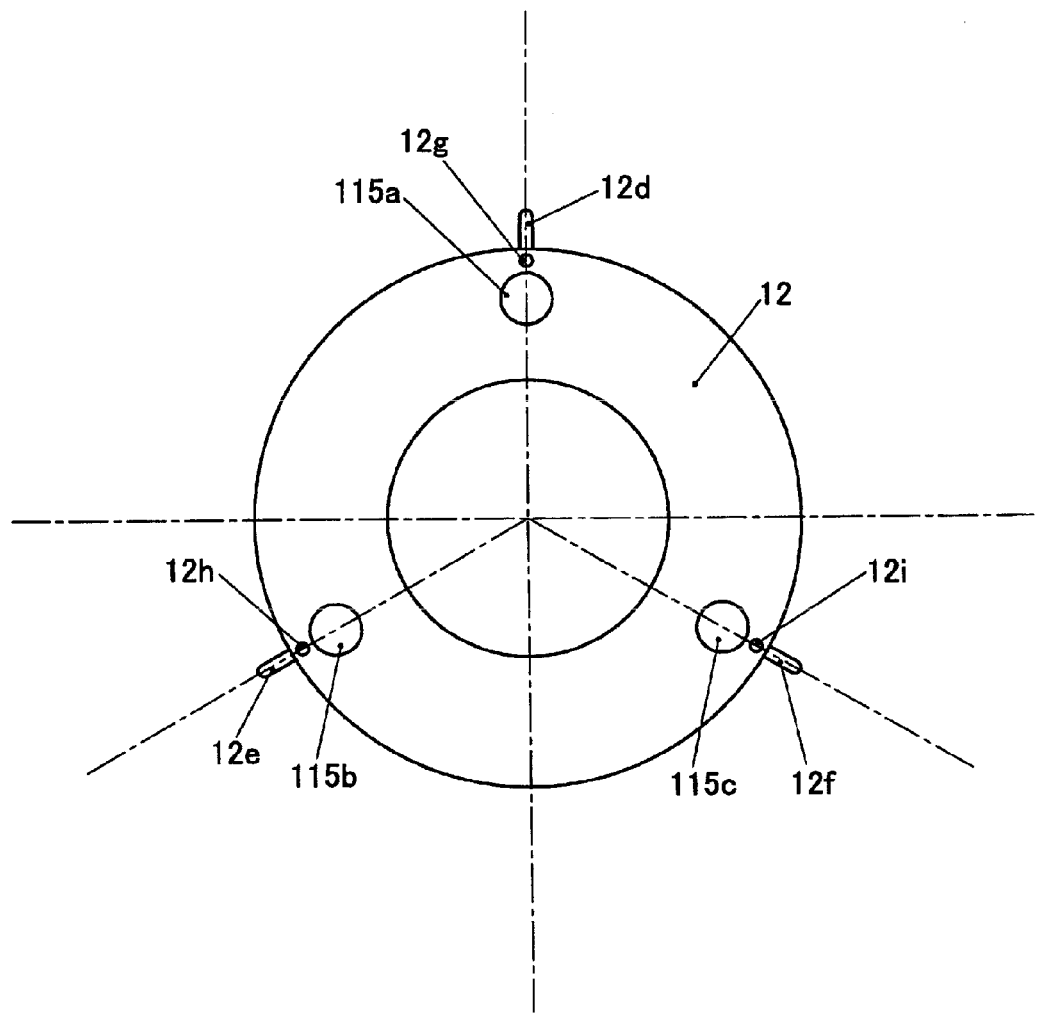
FIG. 5 is a plan view showing a back surface of a lens frame in an optical apparatus in embodiment 1.

FIG. 4 is a plan view showing the supporting portion 13 and each component provided on the supporting portion 13 in the optical apparatus of the present embodiment. FIG. 5 is a plan view showing a back surface of the lens frame 12 in the optical apparatus of the present embodiment (a view of the lens frame 12 shown in FIGS. 1 and 3 when viewed from a back side of the lens frame 12).

As shown in FIG. 4, the optical axis direction position detectors 19a to 19c are provided at three areas where they are arranged in a concentric pattern and differ by 120 degrees from one another. A distance (a relative position or a displacement) between the lens frame 12 and the supporting portion 13 is detected by each of the optical axis direction position detectors 19a to 19c. A magnetic sensor such as a hall element (in this case, an index magnet is necessary for the lens frame), or an overcurrent sensor (in this case, a conductive member as an index is necessary for the lens frame) is used as the optical axis direction position detectors 19a to 19c. An optical sensor such as a photo reflector (in this case, a reflective member is necessary for the lens frame) can also be used.

The supporting portion 13 is provided with optical axis direction movement limiting members 13d to 13f that are movement limiting members, which are provided at three areas in a concentric pattern and differ by 120 degrees from one another. The optical axis direction movement limiting members 13d to 13f limit a position of the lens frame 12 with respect to the supporting portion 13 in an optical axis direction (a direction indicated by arrows 113a and 113b in FIG. 2). When the optical axis direction movement limiting member 13d is viewed from a direction of an arrow 114 (see FIG. 6), an elongate hole 13g is provided. Similarly, the optical axis direction movement limiting members 13e and 13f are provided with elongate holes 13h and 13i (not shown), respectively.

As shown in FIG. 5, the lens frame 12 is provided with movement limiting pins 12d to 12f at three areas, respectively. The movement limiting pins 12d to 12f are inserted in the elongate holes 13g to 13i, respectively. Therefore, the lens frame 12 is movable in an optical axis direction and also a direction orthogonal to the optical axis in a range where the movement limiting pins 12d to 12f are not limited by the elongate holes 13g to 13i.

In the present embodiment, the lens frame 12 may be movable only in at least the optical axis direction. Therefore, in the direction orthogonal to the optical axis 10, the movement limiting pins 12d to 12f may be fitted into the elongate holes 13g to 13i to limit movement in a direction other than the optical axis direction. In this case, however, because a sliding friction is generated between the movement limiting pins 12d to 12f and the elongate holes 13g to 13i, the driving accuracy in the optical axis direction is deteriorated. Accordingly, the lens frame 12 is preferably configured to be movable also in the direction orthogonal to the optical axis 10.

The supporting portion 13 is provided with damper members 110a to 110c made of gel-like silicone resin or the like at three areas, respectively. The lens frame 12 is provided with damper pins 12g to 12i which extend from the lens frame 12. The damper pins 12g to 12i of the lens frame 12 are viscoelastically connected with the damper members 110a to 110c of the supporting portion 13 to be able to damp an unnecessary shake at the time of driving the lens frame 12 in the optical axis direction. The damper members 110a to 110c and the damper pins 12g to 12i constitute a damper (referring to FIG. 6, the details will be described later).

As shown in FIG. 5, indexes 115a to 115c of the optical axis direction position detectors 19a to 19c are provided on the back surface of the lens frame 12 (back side of the plane shown in FIGS. 1 and 3). When the optical axis direction position detectors 19a to 19c are, for example magnetic sensors, magnets are used as indexes 115a to 115c. When the optical axis direction position detectors 19a to 19c are overcurrent sensors, conductive members such as metal plates are used, and when they are optical sensors, reflective members are used.

Figure 6:
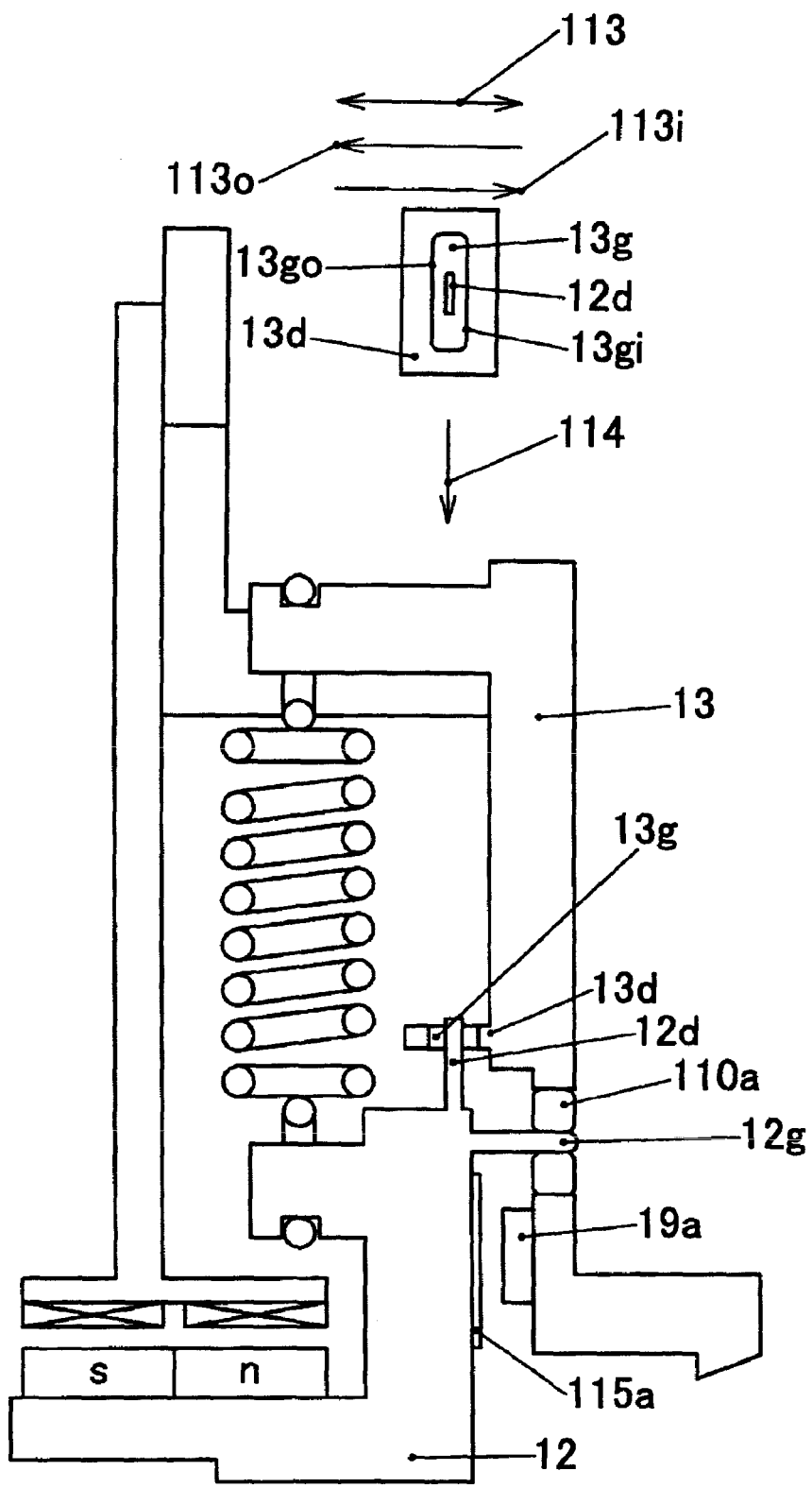
FIG. 6 is an enlarged cross-sectional view of an optical axis direction driver and an optical axis direction position detector in an optical apparatus in embodiment 1.

FIG. 6 is an enlarged cross-sectional view showing an optical axis direction driver and an optical axis direction position detector which are depicted by enlarging a part of FIG. 2 in the optical apparatus of the present embodiment. As shown in FIG. 6, the damper pin 12g extended from the lens frame 12 is inserted in the damper member 110a provided on the supporting portion 13.

Each of the damper members 110a to 110c made of gel-like silicone resin or the like fills in a hole of the supporting portion 13 in a state of liquid. After each of the damper members 110a to 110c is inserted into the damper pins 12g to 12i, the damper members 110a to 110c are hardened by ultraviolet ray or the like. The damper members 110a to 110c are changed to be gel after the hardening to exert a damping effect. Thus, the optical apparatus of the present embodiment is provided between the lens frame 12 and the supporting portion 13 and has a damper which damps a shake generated by the lens frame 12 moving in the optical axis direction.

Figure 7:
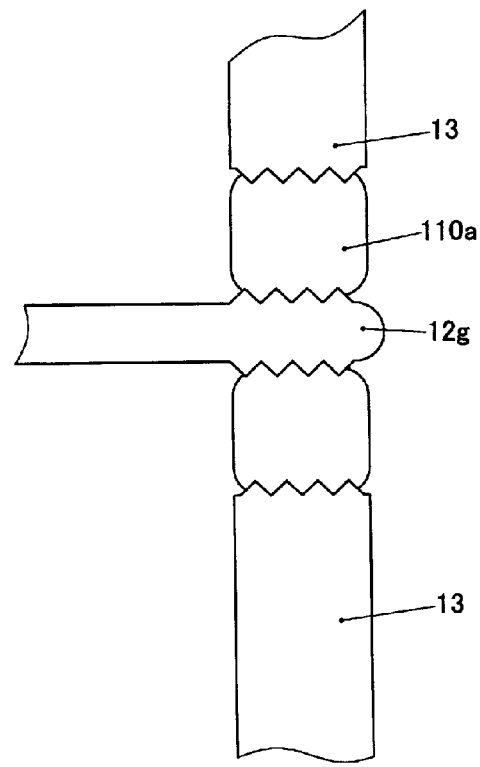
FIG. 7 is a further enlarged cross-sectional view of a damper member (a damper) and a damper pin in an optical apparatus in embodiment 1.

FIG. 7 is a cross-sectional view in which a damper member and a damper pin that are a damper are further enlarged in the optical apparatus of the present embodiment. As shown in FIG. 7, small concavity and convexity are formed on surfaces of the damper pin 12g (it is the same for the damper pins 12h and 12i) and the supporting portion 13. The damper member 110a (it is the same for the damper members 110b and 110c) surely engages with the damper pin 12g by such concavity and convexity.

Therefore, even if the damper pins 12g to 12i move in an optical axis direction (a direction of an arrow 113 in FIG. 6) with respect to the supporting portion 13, the unnecessary shake caused by the movement in the optical axis direction can be damped. In other words, a peak Q in the vicinity of natural frequency determined by spring constants of the elastic devices 14a to 14c that are tension coil springs and by the mass of an object to be driven such as the lens frame 12 and the focus correction lens 11a can be reduced.

Figure 8:
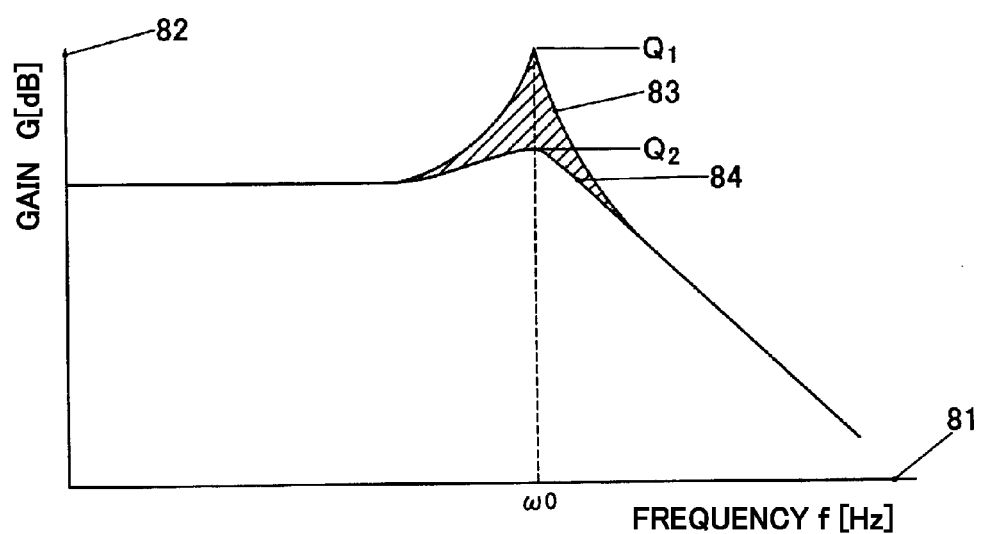
FIG. 8 is a frequency characteristic view describing an effect of a damper in an optical apparatus of embodiment 1.

FIG. 8 is a frequency characteristic view describing an effect of the damper in the optical apparatus of the present embodiment. In FIG. 8, a horizontal axis 81 denotes an input frequency (f[Hz]), and a vertical axis 82 denotes a relation of the motion of the lens frame 12 in an optical axis direction with respect to the input electric current of the optical axis direction driver (gain G [dB], logarithmic display of a ratio). A waveform 83 is frequency characteristics when the damper is not provided, and on the other hand, a waveform 84 is frequency characteristics when the damper is provided.

Reference symbol ω0 denotes a natural frequency which is determined by the relation between the total mass of objects to be driven such as the lens frame 12, the focus correction lens 11a, and the permanent magnets 15a to 15c and the total spring constant of the elastic devices 14a to 14c. In the natural frequency ω0, the waveform 83 indicates a peak Q1 and the waveform 84 indicates a peak Q2.

Thus, the optical apparatus of the present embodiment is provided with the damper to be able to suppress the peak Q1 to the peak Q2. Therefore, even if the natural frequency ω0 is inputted due to the disturbance or the like, the lens frame 12 does not widely shake in an optical axis direction. According to the optical apparatus of the present embodiment, a stable drive in the optical axis direction can be performed.

As shown in FIG. 6, the optical axis direction position detector 19a and the index 115a are arranged so as to face and be parallel to each other. Therefore, although the optical axis direction position detector 19a detects a relative displacement between the lens frame 12 and the supporting portion 13 in the optical axis direction, there is no sensitivity for a displacement in other directions (for example, a direction orthogonal to the optical axis direction). Accordingly, even if a backlash or the like in a direction different from the optical axis direction is generated, the detected position in the optical axis direction can be read without an error.

The combinations of the movement limiting pins 12d to 12f and the optical axis direction movement limiting members 13d to 13f, respectively, as described above, limit the position of the lens frame 12 with respect to the supporting portion 13 in the optical axis direction (the arrows 113a and 113b in FIG. 2). When the optical axis direction movement limiting member 13d is viewed from the direction of an arrow 114 (see FIG. 6), the elongate hole 13g is provided and the movement limiting pin 12d of the lens frame 12 shown in FIG. 5 is inserted in the elongate hole 13g.

Therefore, in the case where the lens frame 12 is driven in an object direction (a direction of an arrow 113o) of an optical system in the optical axis direction (the direction of the arrow 113), the movement limiting pin 12d contacts a first side 13go (a movement limiting portion) of the elongate hole 13g when it is driven by a predetermined amount to limit the movement in the optical axis direction. Similarly, in the case where the lens frame 12 is driven in an image plane direction (a direction of an arrow 113i) of the optical system in the optical axis direction, the movement limiting pin 12d contacts a second side 13gi (a movement limiting portion) of the elongate hole 13g when it is driven by a predetermined amount to limit the movement in the optical axis direction. The same relationship is true for the movement limiting pin 12e and the optical axis direction movement limiting member 13e, and the movement limiting pin 12f and the optical axis direction movement limiting member 13f, and in each case, the movement limitation in the optical axis direction is performed.

Thus, the movement limiting member limits the movement of the lens frame at both ends of the movement distance. When all movement limiting pins 12d to 12f contact corresponding one of first sides (object sides) of the optical axis direction movement limiting members 13d to 13f, the lens frame 12 performs a position calculation with respect to the supporting portion 13 with reference to the corresponding one of the first sides. Similarly, when all movement limiting pins 12d to 12f contact corresponding one of second sides (image plane sides) of the optical axis direction movement limiting members 13d to 13f, the lens frame 12 performs a position calculation with respect to the supporting portion 13 with reference to the corresponding one of the second sides. This is a mechanism that is provided for calibrating the optical axis direction position detectors 19a to 19c. Hereinafter, a method for calibrating the optical axis direction position detectors 19a to 19c will be described.

Outputs of the optical axis direction position detectors 19a to 19c vary in accordance with the environment such as temperature or humidity. Therefore, when the outputs of the optical axis direction position detectors 19a to 19c are used, as they are, to move the lens frame 12 by the optical axis direction driver (the coils 17a to 17c, the permanent magnets 15a to 15c, and the drivers 112a to 112c), the movement amount may not be accurate. The output of each of the optical axis direction position detectors 19a to 19c also varies. Therefore, except for the case where all the movement limiting pins 12d to 12f contact corresponding one side of the optical axis direction movement limiting members 13d to 13f, the planarity of the lens frame 12 may not be maintained.

In the embodiment, when all the movement limiting pins 12d to 12f contact corresponding one of the first sides (object sides) of the optical axis direction movement limiting members 13d to 13f, corresponding one of the outputs of the optical axis direction position detectors 19a to 19c is measured to uniform the outputs at a constant value. Similarly, when all the movement limiting pins 12d to 12f contact corresponding one of the second sides (image plane sides) of the optical axis direction movement limiting members 13d to 13f, corresponding one of the outputs of the optical axis direction position detectors 19a to 19c is measured to uniform the outputs at a constant value.

Figure 9:
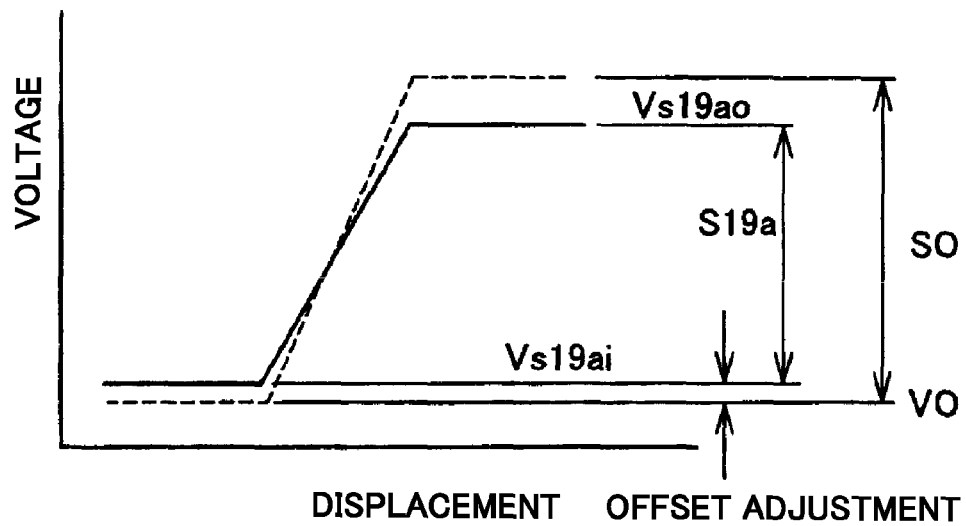
FIG. 9 is a view describing a method for calibrating an optical axis direction position detector in an optical apparatus of embodiment 1.
Figure 10:
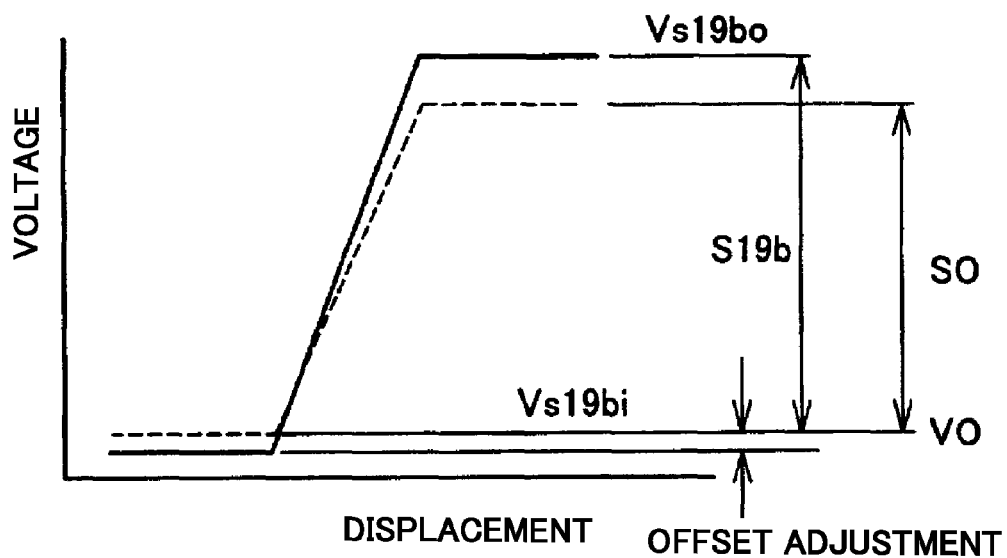
FIG. 10 is a view describing a method for calibrating an optical axis direction position detector in an optical apparatus of embodiment 1.
Figure 11:
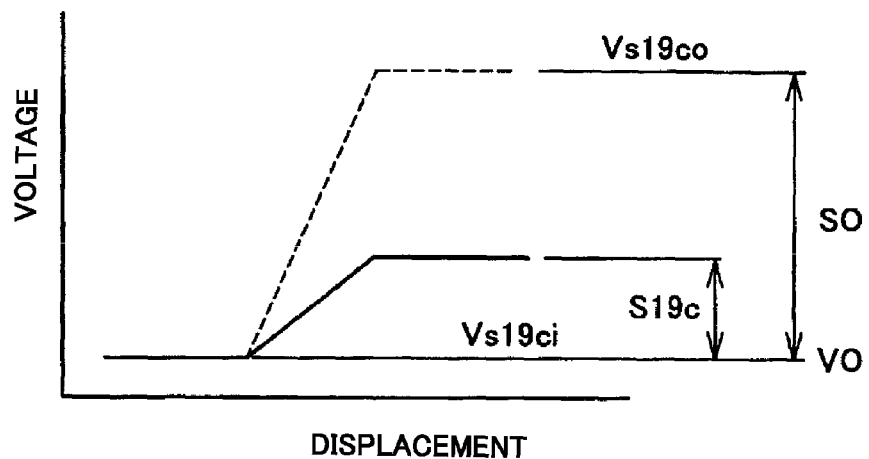
FIG. 11 is a view describing a method for calibrating an optical axis direction position detector in an optical apparatus of embodiment 1.

FIGS. 9 to 11 are views describing a method for calibrating the optical axis direction position detector in the optical apparatus of embodiment 1. FIGS. 9 to 11 show the optical axis direction position detectors 19a to 19c, respectively.

As shown in FIG. 9, an output voltage of the optical axis direction position detector 19a is defined as Vs19ao when the movement limiting pin 12d contacts the first side (object side) of the optical axis direction movement limiting member 13d. Further, an output voltage of the optical axis direction position detector 19a is defined as Vs19ai when the movement limiting pin 12d contacts the second side (image plane side) of the optical axis direction movement limiting member 13d. The calibration portion obtains a sensitivity S19a of the optical axis direction position detector 19a from the difference of these output voltages, and changes a gain of the optical axis direction position detector 19a or changes driving current of the optical axis direction position detector 19a so that the sensitivity S19a is set to be a predetermined sensitivity S0. Further, the calibration portion adjusts an output offset of the optical axis direction position detector 19a so that the output voltage Vs19ai is set to be a reference voltage V0. As described later, the calibration portion includes sensitivity adjusting portions 1204d to 1204f and offset adjusting portions 1204g to 1204i.

As shown in FIGS. 10 and 11, the same calibration as that of FIG. 9 is also performed for the other optical axis direction position detectors 19b and 19c. In other words, when the movement limiting pins 12e and 12f contact corresponding one of the first sides (object sides) of the optical axis direction movement limiting members 13e and 13f, output voltages of the optical axis direction position detectors 19b and 19c are defined as Vs19bo and Vs19co, respectively. Further, when the movement limiting pins 12e and 12f contact corresponding one of the second sides (image plane sides) of the optical axis direction movement limiting members 13e and 13f, output voltages of the optical axis direction position detectors 19b and 19c are defined as Vs19bi and Vs19ci, respectively. The calibration portion obtains sensitivities S19b and S19c from these values to perform a calibration or an offset adjustment so that both sensitivities S19b and S19c are set to be a predetermined sensitivity S0.

Thus, the optical apparatus of the present embodiment includes a calibration portion which calibrates sensitivities of the optical axis direction position detectors 19a to 19c. Further, it includes a movement limiting member (optical axis direction movement limiting members 13d to 13f) which limits a distance between the lens frame 12 and the supporting portion 13. The calibration portion calibrates these sensitivities based on signals detected by the optical axis direction position detectors 19a to 19c when the distance limited by the movement limiting member is a maximum.

In a state where the movement limiting pin contacts the first side and the second side, the movement limiting portion, the movement limiting pin, the lens frame, or the like is arranged so that the lens that the lens frame holds is arranged to be orthogonal to an imaging optical axis. In the embodiment, "orthogonal" is not limited to the case where it is strictly orthogonal, but includes the case where it is substantially orthogonal, i.e. almost orthogonal.

Therefore, the outputs of the optical axis direction position detectors at reference positions of the first side and the second side are signals obtained when the lens is held to be orthogonal to the imaging optical axis at the positions of the first side and the second side, respectively. In other words, because the tilt of the lens with respect to the imaging optical axis can be accurately detected by seeing the signal of the optical axis direction detector, the correction can be quickly performed when the tilt is generated.

Subsequently, the optical axis direction driver drives the lens frame 12 regarding the calibrated output value as a position of the lens in the optical axis direction detected by the optical axis direction position detectors 19a to 19c. Thus, according to the optical apparatus of the present embodiment, the lens frame 12 can move in the optical axis direction with high accuracy. As described above, the output values of the optical axis direction position detectors 19a to 19c vary in accordance with the use environment or the like. Therefore, the calibration is preferably performed every time the lens is driven by an AF drive or a wobbling drive or the camera is turned on or the like.

Figure 12:
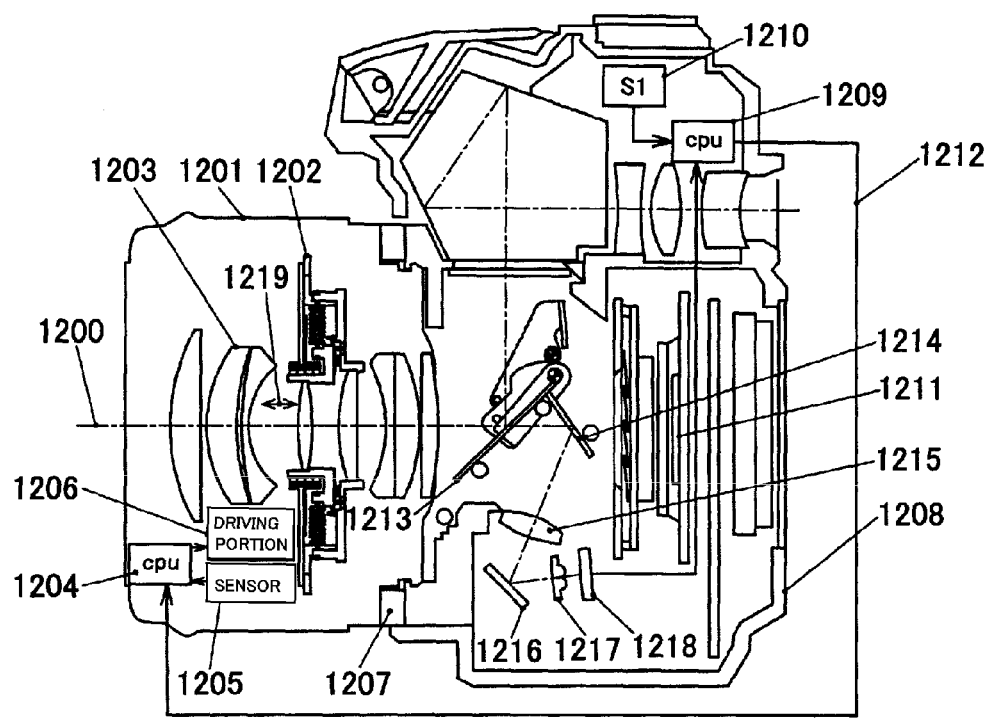
FIG. 12 is a cross-sectional view of an imaging apparatus which mounts an optical apparatus of embodiment 1.

FIG. 12 is a cross-sectional view of an imaging apparatus which mounts the optical apparatus of embodiment 1.

As shown in FIG. 12, an optical apparatus 1202 including the lens frame 12 and the supporting portion 13 is provided inside a lens barrel 1201. The lens barrel 1201 is configured to be detachable from a camera body 1208 via a mount 1207.

The lens barrel 1201 is provided with a lens CPU 1204. The lens CPU 1204 communicates with a camera CPU 1209 provided in the camera body 1208 via a contact provided on the mount 1207. In FIG. 12, the communication between the lens CPU 1204 and the camera CPU 1209 is indicated by an arrow 1212.

An AF sensor 1218 that receives object light beam on an optical axis 1200 via a quick return mirror 1213, a sub-mirror 1214, a field lens 1215, a reflection mirror 1216, and a glasses lens 1217 is provided inside the camera body 1208. The AF sensor 1218 is a known sensor of a phase difference detecting type, and sends its output signal to the camera CPU 1209 by triggering the operation of an operating member 1210 provided on the camera body 1208. The camera CPU 1209 calculates to determine an in-focus state based on the obtained AF signal to send the result to the lens CPU 1204

The output signal from the optical axis direction position detectors 19a to 19c (In FIG. 12, they are collectively denoted as a sensor 1205) shown in FIG. 4 or the like is inputted to the lens CPU 1204. The lens CPU 1204 outputs a predetermined control signal to the coils 17a to 17c (In FIG. 12, they are collectively denoted as a driving portion 1206) shown in FIG. 3 or the like, based on the output signal from the sensor 1205 and the in-focus state determining signal from the camera CPU 1209.

In this case, the lens CPU 1204 outputs the control signal so that the camera CPU 1209 which receives the signal of the AF sensor 1218 performs the in-focus determination. The driving portion 1206 (driver) drives the focus correction lens 11*a* (see FIG. 2) which constitutes the optical apparatus 1202 in an optical axis direction 1219 based on the control signal from the lens CPU 1204. Therefore, the tilt of the focus correction lens 11*a* is suppressed by the control of the lens CPU 1204. Thus, the lens CPU 1204 functions as a controller that controls the driving portion 1206 so that the tilt of the focus correction lens 11*a* is suppressed based on the signal detected by the optical axis direction position detectors 19*a* to 19*c*.

The camera CPU 1209 exposes the subject image onto an image pickup element 1211 during a predetermined time period based on the operation of the operating member 1210 after the in-focus, and records the signal on a recording medium (not shown).

As described above, the present embodiment has described the case where the optical apparatus 1202 (focus correction lens 11*a*) is driven to be in focus based on the signal of the AF sensor 1218, but is not limited to this. The optical apparatus 1202 of the present embodiment is also used for the determination of the in-focus state, as well as the in-focus drive to the imaging plane of the image pickup element 1211. For example, it is the case of a known TV-AF method (contrast detecting method) in which the in-focus determination is performed by evaluating an image signal of the image pickup element 1211 without using the AF sensor 1218.

In the TV-AF method, for example a lens 1203 is scanned in an optical axis direction to evaluate the image signal of the image pickup element 1211 at each position of the lens 1203 in the optical axis direction. A position of the lens 1203 where the sharpest image is obtained is determined as an in-focus position, and finally the lens 1203 is returned to the position to be in focus. However, it is necessary for the TV-AF method to scan the lens 1203 to evaluate the change of the image signal of the image pickup element 1211 to determine the in-focus. Therefore, the lens 1203 has to be scanned every time the focusing is performed.

Therefore, the in-focus state is determined by minimally and rapidly performing a round-trip scanning of the lens at the imaging time to evaluate the image at the time. Thus, because the necessity of the scanning at the focusing time (the scanning is not performed if the scanning is unnecessary because it has already been in focus) or the scanning direction in the case where the scanning is necessary can be identified, the focusing can be completed at an early time.

The minimal high-speed scanning of the lens at this time is referred to as a wobbling. In the wobbling, although a lens scanning amount is minimal, it is necessary to repeatedly perform a high-speed and accurate scanning in an optical axis direction. Thus, the optical apparatus 1202 of the present embodiment is also applicable as a wobbling which rapidly shakes the lens in the optical axis direction, not for performing an in-focus drive of the lens using an AF signal.

In FIG. 12, when the camera CPU 1209 performs a wobbling direction to the lens CPU 1204 at the TV-AF time, the lens CPU 1204 outputs a predetermined control signal to the driving portion 1206 based on the direction. The driving portion 1206 rapidly shakes the focus correction lens 11*a* of the optical apparatus 1202 in the optical axis direction 1219 based on the control signal from the lens CPU 1204.

In this case, the lens CPU 1204 monitors a signal of the sensor 1205, and outputs the control signal to the driving portion 1206 based on the result. Therefore, the focus correction lens 11*a* can rapidly shake in the optical axis direction with great accuracy.

In the imaging apparatus shown in FIG. 12, the accuracy of the optical axis direction position detectors 19*a* to 19*c* is important. The reference position of the lens frame 12 is determined by mechanical stoppers (optical axis direction movement limiting members 13*d* to 13*f*). As described above, the calibrations of the optical axis direction position detectors 19*a* to 19*c* are performed based on the outputs of the optical axis direction position detectors 19*a* to 19*c* at the reference positions. The details will be described referring to a block diagram of FIG. 13 and a flowchart of FIG. 14.

Figure 13:
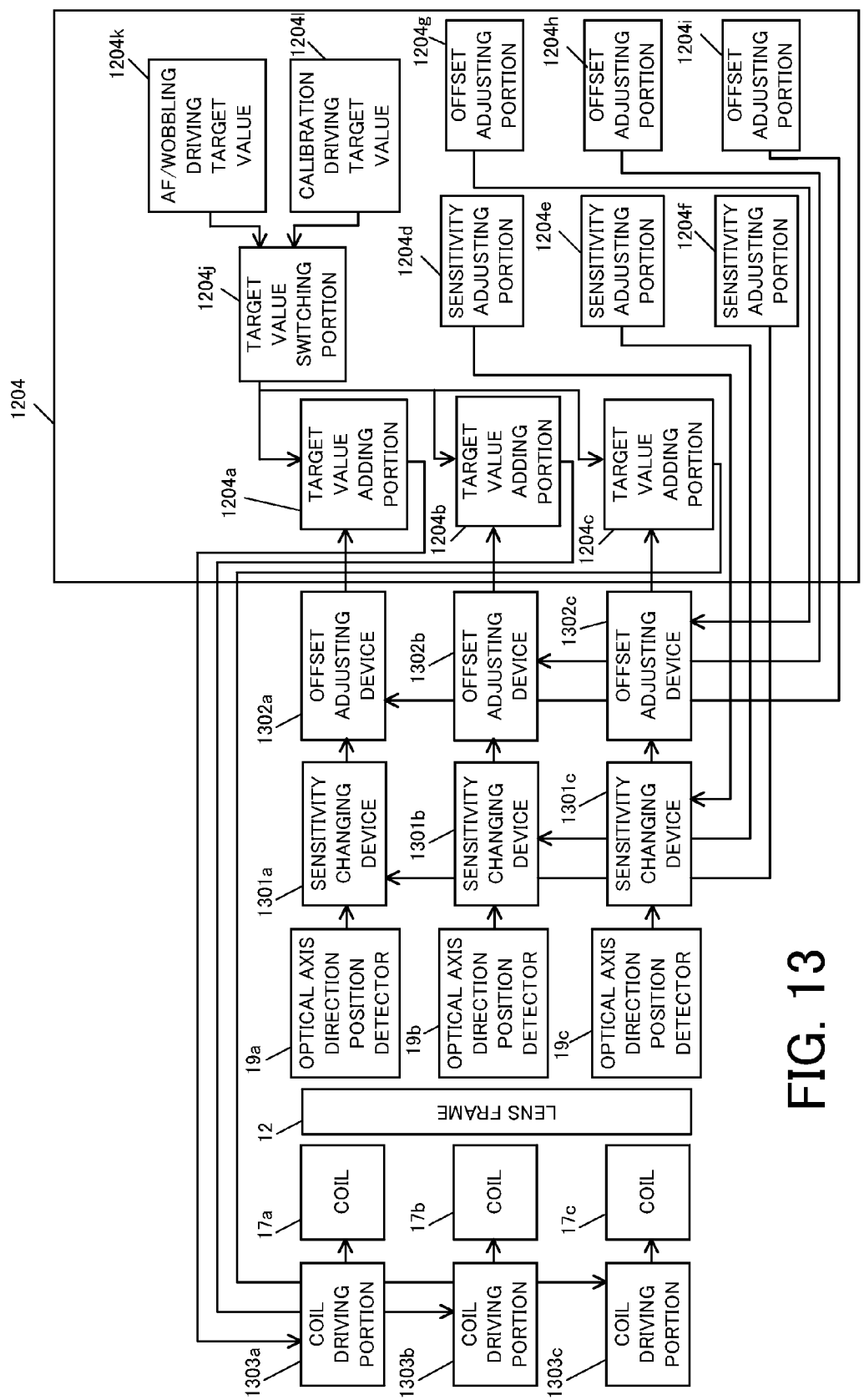
FIG. 13 is a block diagram of an optical apparatus in embodiment 1.

FIG. 13 is a block diagram of an optical apparatus in the present embodiment.

In FIG. 13, the optical axis direction position detectors 19*a* to 19*c* detect positions of three points of the lens frame 12 in the optical axis direction. The outputs of the optical axis direction position detectors 19*a* to 19*c* are inputted to target value adding portions 1204*a* to 1204*c* of the lens CPU 1204 via sensitivity switching portions 1301*a* to 1301*c* and offset adjusting devices 1302*a* to 1302*c*, respectively. When each signal is inputted to the lens CPU 1204, it is converted from an analog signal to a digital signal by a known A/D converter (not shown in FIG. 13) which is provided in the lens CPU 1204.

Each of movement target values of the lens for an AF drive or a wobbling drive described later are added to the target value adding portions 1204*a* to 1204*c*, and the added outputs are inputted to coil driving portions 1303*a* to 1303*c* of the optical apparatus, respectively. A known PWM (Pulse Width Modulation) signal is inputted from the lens CPU 1204 to the coil driving portions 1303*a* to 1303*c*, and an efficient coil drive is performed.

The electric power from the coil driving portions 1303*a* to 1303*c* is supplied to the coils 17*a* to 17*c*, and the lens frame 12 is driven in the optical axis direction by thrust forces generated by the coils 17*a* to 17*c*. Thus, the movement of the lens frame 12 is detected by the optical axis direction position detectors 19*a* to 19*c* and a known servo technology that feeds back the result to the coil driving portions 1303*a* to 1303*c* is used to be able to drive the lens frame 12 with high accuracy.

A target value switching portion 1204*j* of the lens CPU 1204 switches an AF/wobbling driving target value 1204*k* and a calibration driving target value 1204*l* for the AF drive or the wobbling drive. The target value switching portion 1204*j* selects one of the target values to input it to the target value adding portions 1204*a* to 1204*c*.

Hereinafter, the case where the target value switching portion 1204*j* inputs the calibration driving target value 1204*l* to the target value adding portions 1204*a* to 1204*c* will be described.

In this case, as described above, the lens CPU 1204 drives the lens frame 12 up to the position where the movement of the lens frame 12 is limited to the object side and the image plane side by the optical axis direction movement limiting members 13*d* to 13*f*. Further, it obtains the sensitivities S19*a* to S19*c* of the optical axis direction position detectors 19*a* to 19*c* based on the outputs of the optical axis direction position detectors 19*a* to 19*c* at a position where the movement of the lens frame 12 is limited to the object side and the image plane side. The lens CPU 1204 compares the predetermined reference sensitivity S0 and the reference voltages V0 of the optical axis direction position detectors 19*a* to 19*c* in a state where the lens frame 12 is in an image plane side position limiting state with each output obtained above.

Based on the result, the sensitivity adjusting portions 1204*d* to 1204*f* change the sensitivities of the sensitivity changing devices 1301*a* to 1301*c* to uniform the sensitivities S19*a* to S19*c* of all the optical axis direction position detectors 19a to 19c to the reference sensitivity S0. The offset adjusting portions 1204g to 1204i perform adjustments so that the output voltages Vs19ai to Vs19ci of the optical axis direction position detectors 19a to 19c at the image plane position side limiting position is set to be the reference voltage V0.

When the adjustments of the sensitivity and the offset is completed, the target value switching portion 1204j switches so that the AF/wobbling driving target value 1204k is inputted to the target value adding portions 1204a to 1204c. Thus, the lens CPU 1204 drives the lens frame 12 in the optical axis direction to perform a focusing or a wobbling. In FIG. 13, the sensitivity changing devices 1301a to 1301c and the offset adjusting devices 1302a to 1302c are provided outside the lens CPU 1204, but the present invention is not limited to this. The sensitivity changing devices 1301a to 1301c and the offset adjusting devices 1302a to 1302c can also be provided inside the CPU 1204.

Figure 14:
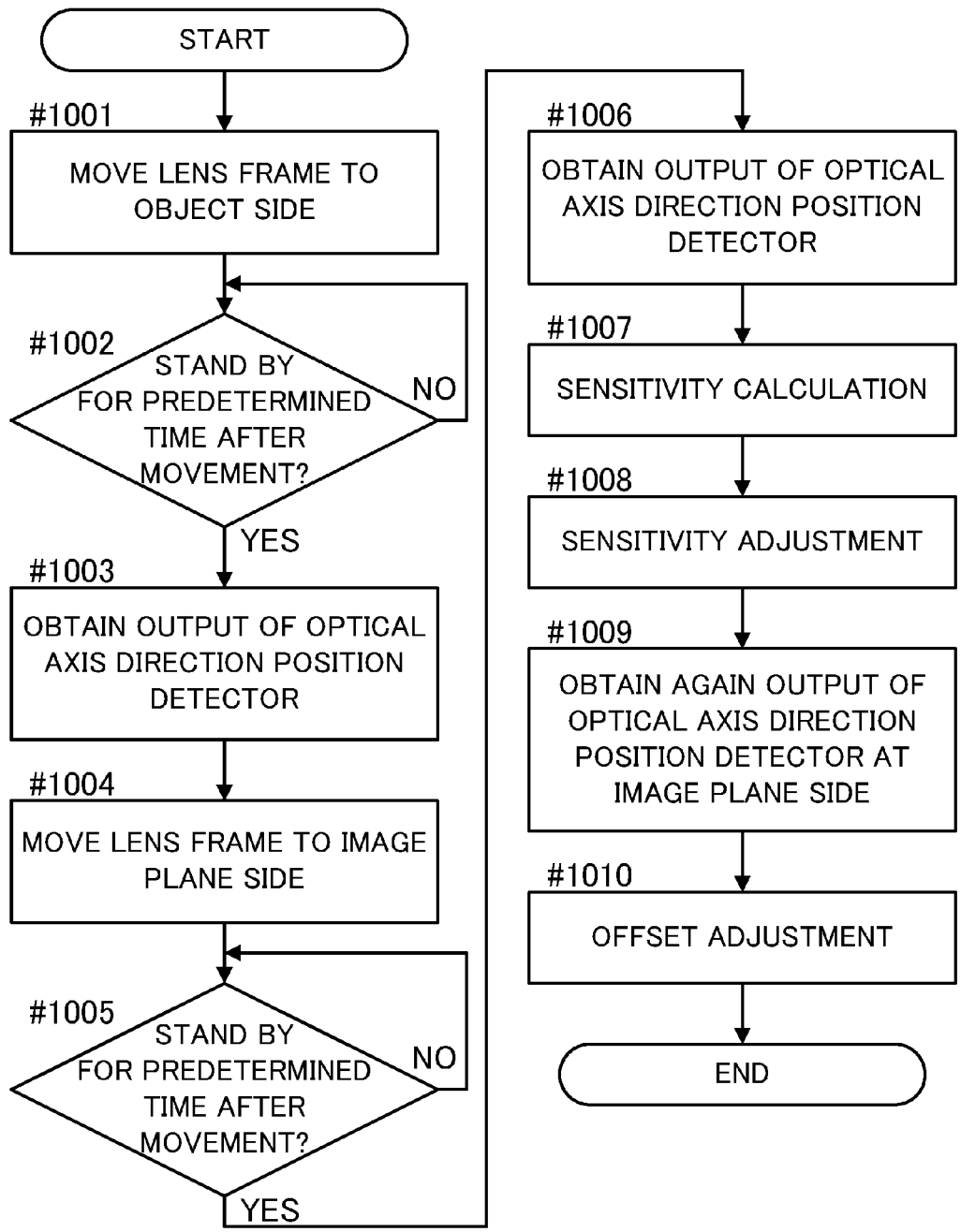
FIG. 14 is a flowchart describing a motion of an optical apparatus in embodiment 1.

FIG. 14 is a flowchart describing the operation of the optical apparatus in the present embodiment. The flow shown in FIG. 14 starts from a driving start time for an AF or a wobbling start time. In this flow, general operations which are not directly relevant to the present embodiment (for example, power check step) are omitted.

First, in Step #1001, the lens CPU 1204 controls the coil driving portions 1303a to 1303c so that it applies electric current to the coils 17a to 17b to move the lens frame 12 to the object side. In this case, the lens frame 12 contacts the three optical axis direction position limiting members at the same time by driving all of the three optical axis direction drivers (coils 17a to 17c) in the same phase direction. Therefore, the lens frame 12 can ensure its planarity.

Next, in Step #1002, the lens CPU 1204 stands by until the movement of the lens frame 12 is completed and the mechanical transient response (shake) vanishes. After a predetermined time has passed, in Step #1003, the outputs of the optical axis direction position detectors 19a to 19c at this position are obtained.

In Step #1004, the lens CPU 1204 controls the coil driving portions 1303a to 1303c so that it applies electric current to the coils 17a to 17c to move the lens frame 12 to the image plane side. In this case, the lens frame 12 contacts the three optical axis direction position limiting members at the same time by driving all of the three optical axis direction drivers (coils 17a to 17c) in the same phase direction. Therefore, the lens frame 12 is able to ensure its planarity.

Next, in Step #1005, the lens CPU 1204 stands by until the movement of the lens frame 12 is completed and the mechanical transient response (shake) vanishes. After a predetermined time has passed, in Step #1006, the outputs of the optical axis direction position detectors 19a to 19c at this position are obtained. After this, also, the lens frame 12 is biased to a limiting position at the image plane side for a while.

In Step #1007, based on the outputs of the optical axis direction position detectors 19a to 19c obtained in Step #1003 and Step #1006, the sensitivities 519a to 519c of the optical axis direction position detectors 19a to 19c are calculated.

In Step #1008, the sensitivity adjusting portions 1204d to 1204f compare the calculated sensitivities 519a to 519c with the reference sensitivity S0. Further, they perform the sensitivity changes of the sensitivity changing devices 1301a to 1301c so that the sensitivities of the optical axis direction position detectors 19a to 19c are set to be the reference sensitivity S0.

Subsequently, in Step #1009, the outputs of the optical axis direction position detectors 19a to 19c at the image plane side limiting positions are obtained again. It is because the previously obtained output voltages Vs19ai to Vs19ci may be changed in accordance with the change of the sensitivity.

In Step #1010, the offset adjustment is performed so that the output voltages Vs19ai to Vs19ci of the optical axis direction position detectors 19a to 19c, respectively, obtained in Step #1009 are set to be the reference output V0. The flow shown in FIG. 14 is finished by performing the above steps.

As described above, in the present embodiment, the position of the focus correction lens 11a in the optical axis direction is detected by the optical axis direction position detectors 19a to 19c which are provided on at least three areas. The lens CPU 1204 performs a drive control of the optical axis direction drivers (coil 17a to 17c) independently, which correspond to the optical axis direction position detectors 19a to 19c, respectively, based on the detected result. Thus, the optical apparatus of the present embodiment is able to perform a stable focusing without generating a tilt of the focus correction lens 11a.

In the optical apparatus of the present embodiment, the lens frame 12 holds the focus correction lens 11a to be movable in the optical axis direction inside the lens barrel 1201. The elastic devices 14a to 14c (elastic supporting devices) elastically support the lens frame 12 with respect to the supporting portion 13 inside the lens barrel 1201. The plurality of optical axis direction position detectors 19a to 19c detect relative positions between the supporting portion 13 and the lens frame 12 in the optical axis direction.

Further, the plurality of optical axis direction drivers (coils 17a to 17c, and permanent magnets 15a to 15c) drive the lens frame 12 with respect to the supporting portion 13 in the optical axis direction. The optical axis direction controller performs a drive control of each of the optical axis direction drivers corresponding to one of the optical axis direction position detectors based on each signal of the optical axis direction position detectors 19a to 19c. The optical axis direction controller includes the sensitivity changing devices 1301a to 1301c, the offset adjusting devices 1302a to 1302c, and the lens CPU 1204.

Thus, the optical apparatus of the present embodiment drives the optical axis direction drivers based on drive signals of the optical axis direction controller to drive the lens frame in the optical axis direction to be able to perform a stable focusing drive.

Further, the lens frame 12 is provided with a calibration portion (sensitivity adjusting portions 1204d to 1204f, and offset adjusting portions 1204g to 1204i) which calibrates the output signals of the optical axis direction position detectors 19a to 19c. The lens frame 12 is provided with the movement limiting pins 12d to 12f, and the supporting portion 13 is provided with the optical axis direction movement limiting members 13d to 13f. The calibration portion calibrates the sensitivities and the offsets of the optical axis direction position detectors 19a to 19c, based on the signals of the optical axis direction position detectors 19a to 19c at the time of moving the maximum amount which is limited by the optical axis direction movement limiting members 13d to 13f. More specifically, the optical axis direction movement limiting members 13d to 13f are provided near the optical axis direction position detectors 19a to 19c, respectively, and the calibration of the output signals of the optical axis direction position detectors is performed by driving all of at least three optical axis direction drivers in the same phase direction.

For a stable driving, a damper (damper members 110a to 110c, and damper pins 12g to 12i) which damps a shake of the lens frame 12 at the time of driving in an optical axis direction is provided between the lens frame 12 and the supporting portion 13. Such a configuration can suppress the tilt of the focus correction lens and realize a lens drive capable of performing a high-speed and silent focusing in a state where the focus correction lens is stably held.

[Embodiment 2]

Next, embodiment 2 of the present invention will be described. In the present embodiment, the same descriptions as those of embodiment 1 will be omitted.

Figure 15:
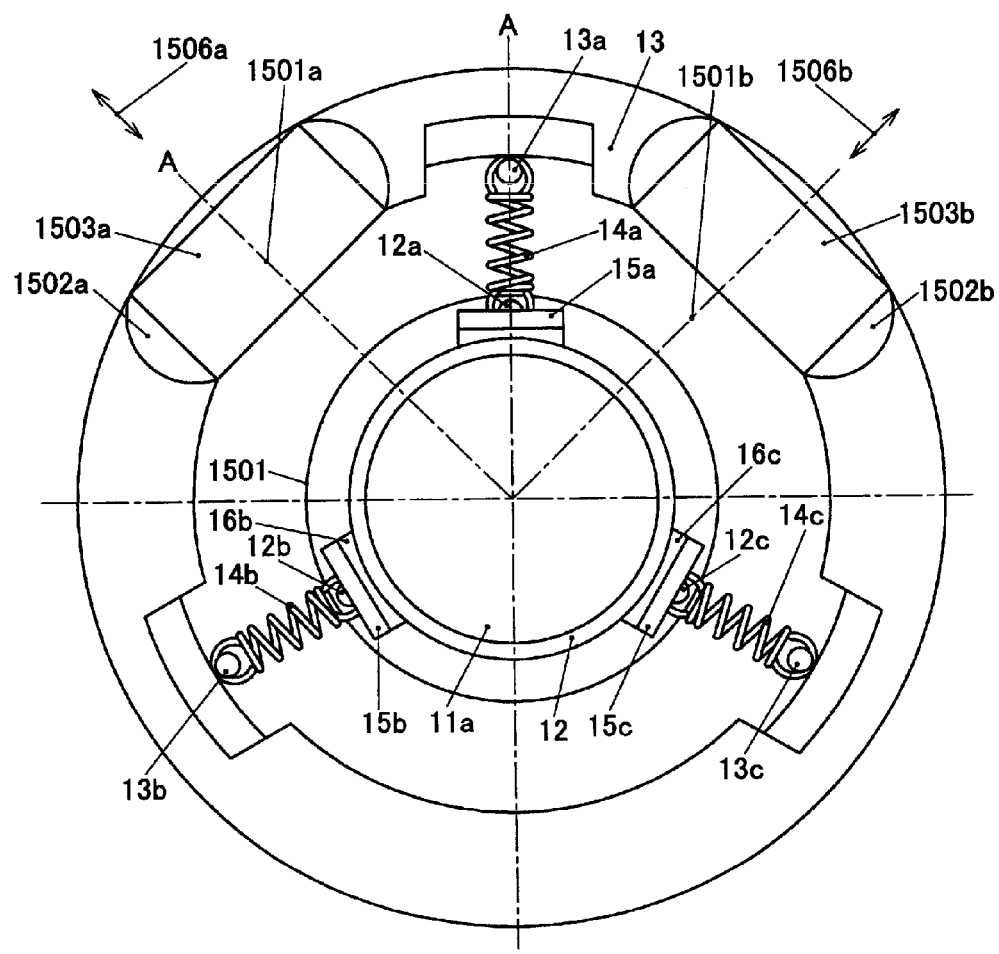
FIG. 15 is a plan view of an optical apparatus in embodiment 2.
Figure 16:
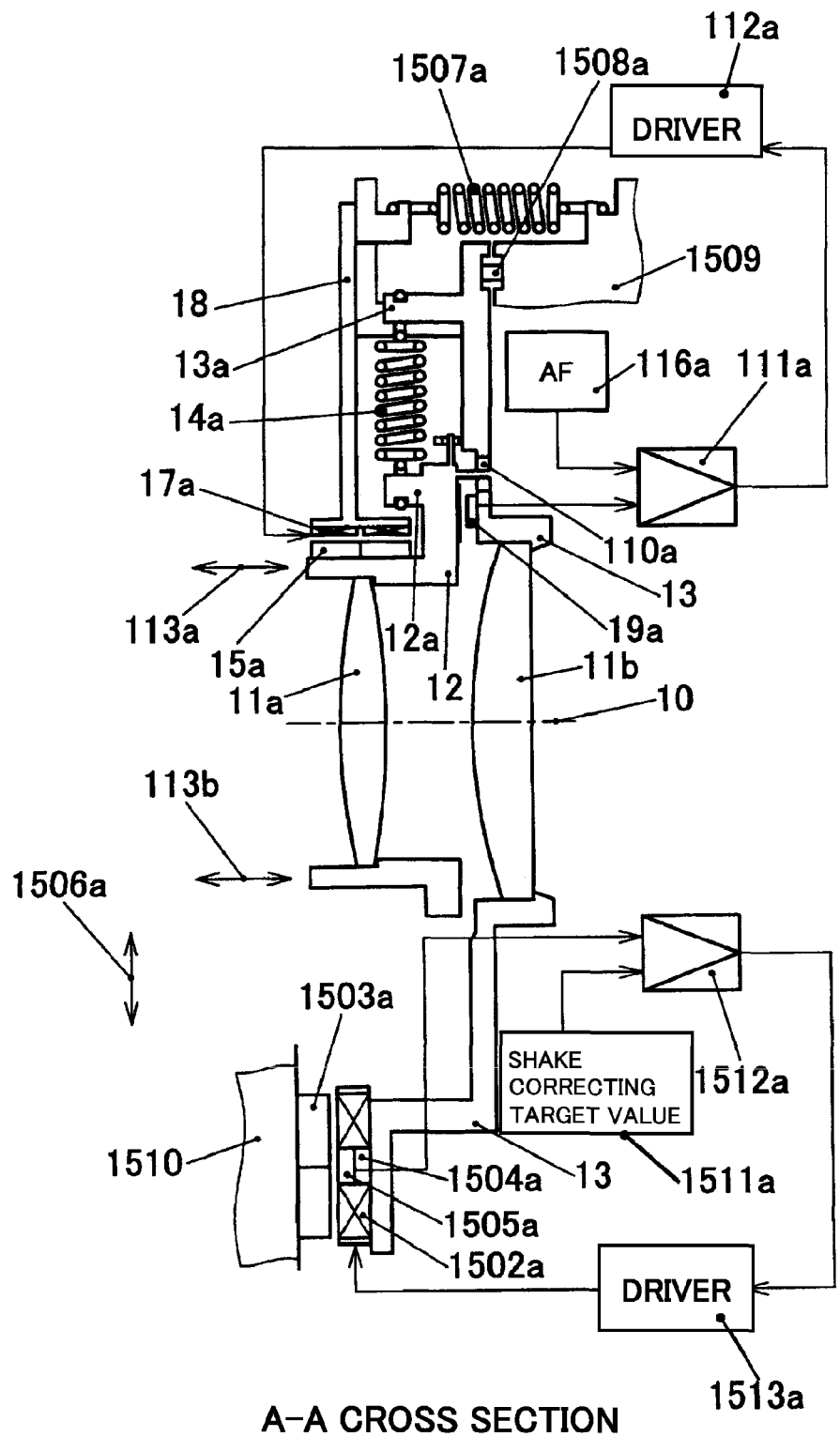
FIG. 16 is a cross-sectional view of an optical apparatus in embodiment 2.

FIG. 15 is a plan view of an optical apparatus in the present embodiment. FIG. 16 is a cross-sectional view of A-A section of FIG. 15 in the optical apparatus of the present embodiment. Embodiment 2 is different from embodiment 1 in that the lens frame 12 is not only driven in an optical axis direction (a direction indicated by arrows 113a and 113b), but also driven in a direction orthogonal to the optical axis direction (a direction indicated by arrows 1506a and 1506b).

As shown in FIGS. 15 and 16, the supporting portion 13 (fixed portion) is provided with shake correcting coils 1502a and 1502b along lines 1501a and 1501b tilted at 45 degrees with respect to an upward and downward direction on a paper surface. The shake correcting permanent magnets 1503a and 1503b are provided on a fixed portion 1510 inside the lens barrel 1201 so as to face the shake correcting coils 1502a and 1502b, respectively.

The supporting portion 13 contacts a fixed portion 1509 in the lens barrel 1201 via rolling balls 1508a to 1508c (the rolling balls 1508b and 1508c are arranged near the back surface of the hook pins 13b and 13c, similarly to the rolling ball 1508a). The lens frame 12 is elastically biased on the fixed portion 1509 in the lens barrel 1201 by the tension coil springs 1507a to 1507c in the optical axis direction (the tension coil springs 1507b and 1507c are arranged near the back surface of the hook pins 13b and 13c, respectively, similarly to the tension coil spring 1507a). In other words, the supporting portion 13 is planarly held with reference to the fixed portion 1509 in the lens barrel 1201 by the rolling balls 1508a to 1508c, and is supported so as to be movable only in a direction orthogonal to the optical axis.

When electric current is applied to the shake correcting coils 1502a and 1502b, the supporting portion 13 is driven in a direction indicated by arrows 1506a and 1506b with respect to the fixed portion 1509. In this case, central portions 1504a and 1504b of the shake correcting coils 1502a and 1502b are provided with shake detectors 1505a and 1505b, respectively, each of which is constituted by a magnetic detection sensor such as a hall element.

In association with the shake correcting permanent magnets 1503a and 1503b facing corresponding one of them, a displacement in a direction indicated by arrows 1506a and 1506b of the supporting portion 13 with respect to the fixed portion 1510 (the fixed portion 1509 and the fixed portion 1510 are fixed to each other) is detected. The lens CPU 1204 controls the electric current applied to the shake correcting coils 1502a and 1502b based on the detected result of the displacement, and a high accurate drive in the direction of the arrows 1506a and 1506b is realized.

Specifically, as shown in FIG. 16, the output of the shake detector 1505a is inputted to a comparator 1512a. The comparator 1512a compares the output value with a shake correcting target value 1511a. The driving portion 1513a controls the electric current applied to the shake correcting coil 1502a based on the comparison result by the comparator 1512a. Each operation of the comparator 1512a and the driving portion 1513a is actually processed by the lens CPU 1204, but the details of this will be described later. Similarly, the driving portion 1513b (not shown) controls the electric current applied to the shake correcting coil 1502b.

In such a configuration, the optical apparatus of the present embodiment is able to move the lens frame 12 in the optical axis direction and the direction orthogonal to it (driven by the supporting portion 13), and the shake correction can also be performed in addition to performing a focusing.

Figure 17:
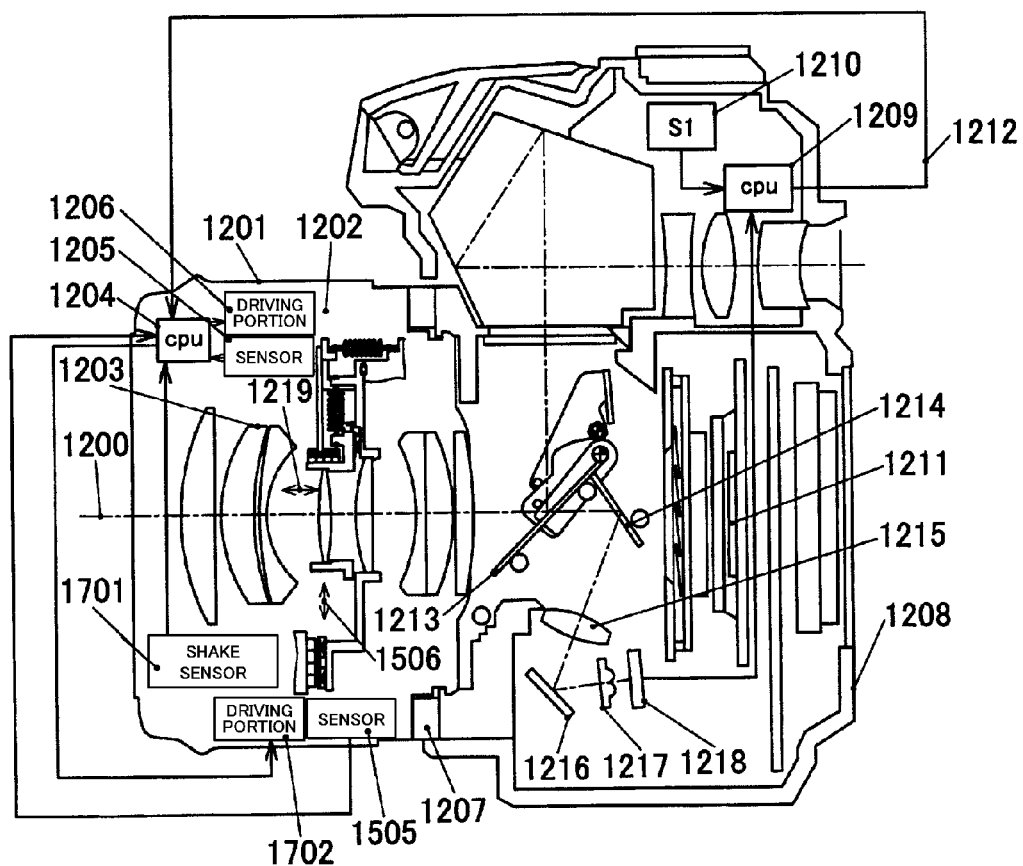
FIG. 17 is a cross-sectional view of an imaging apparatus which mounts an optical apparatus of embodiment 2.

FIG. 17 is a cross-sectional view of an imaging apparatus which mounts the optical apparatus of embodiment 2.

As shown in FIG. 17, an optical apparatus 1202 including the lens frame 12, the supporting portion 13, and the like, is assembled in the lens barrel 1201. The lens barrel 1201 is configured to be detachable from the camera body 1208 via the mount 1207.

An imaging apparatus of the present embodiment is different from that of embodiment 1 in that the lens barrel 1201 is provided with a shake sensor 1701. An output of the shake sensor 1701 and an output of the shake detector (sensor 1505) are inputted to the lens CPU 1204. A control signal from the lens CPU 1204 is inputted to a shake correcting coil driving portion 1702 which drives the shake correcting coils 1502a and 1502b. The lens CPU 1204 performs a shake correction by driving the lens frame 12 of the optical apparatus 1202 in a direction orthogonal to the optical axis 1200 (a direction indicated by an arrow 1506), based on the output signal of the shake sensor 1701.

Figure 18:
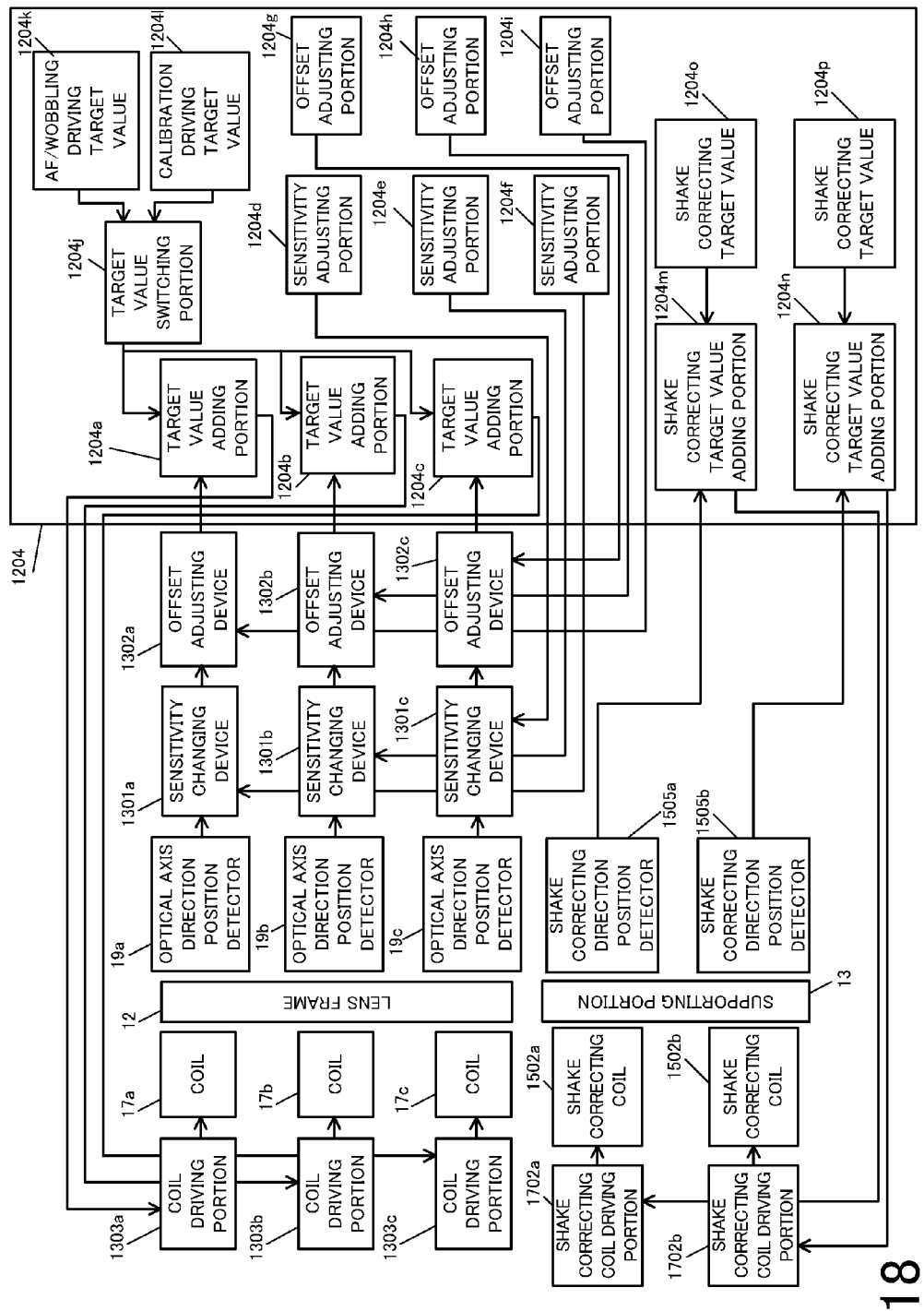
FIG. 18 is a block diagram of an optical apparatus in embodiment 2.

FIG. 18 is a block diagram of the optical apparatus in embodiment 2. It is different from the block diagram of embodiment 1 in that the shake correcting coil driving portions 1702a and 1702b, the shake correcting coils 1502a and 1502b, and the shake detectors 1505a and 1505b are provided. Further, it is different from the optical apparatus of embodiment 1 in that shake correcting target value adding portions 1204m and 1204n, and shake correcting target values 1204o and 1204p are provided. In the present embodiment, the shake correcting coil driving portions 1702a and 1702b are a first optical axis orthogonal direction driver which drives the supporting portion 13 in a direction orthogonal to the optical axis direction so as to correct a shake of an image, based on a signal detected by the shake detectors.

The shake sensor 1701 (see FIG. 17, generally, it is an angular velocity sensor) includes two sensors such as an angular velocity sensor in two directions indicated by arrows 1506a and 1506b so as to drive the supporting portion 13 in the two direction. The output signal from the shake sensor 1701 is inputted to the lens CPU 1204.

The lens CPU 1204 performs appropriate calculations (integral calculation, DC cut calculation, gain adjustment, panning processing, or the like) of the shake signal obtained by the shake sensor 1701, and the obtained signals are defined as the shake correcting target values 1204o and 1204p.

Negative feedbacks of the signals of the shake detectors 1505a and 1505b to the shake correcting coil driving portions 1702a and 1702b are performed via the shake correcting target values 1204o and 1204p in the lens CPU 1204, respectively. Therefore, when the supporting portion 13 is displaced due to the disturbance or other influences, the displacement is detected by the shake detectors 1505a and 1505b. The lens CPU 1204 regards the displacement as an error with respect to the reference position, and applies the electric current to the shake correcting coil driving portions 1702a and 1702b in a direction in which the displacement is reduced to return the supporting portion 13 to the former state.

In the present embodiment, target signals of the shake correcting target values 1204o and 1204p are added to the shake correcting target value adding portions 1204m and 1204n, respectively, as reference signals to perform a highly-accurate shake correction.

In embodiment 1, the signals of the optical axis direction position detectors 19a to 19c have been calibrated before the AF drive. This is because it is necessary to uniform the sensitivities and the reference values of the optical axis direction position detectors 19a to 19c in order to perform an AF drive in a state where the planarity is maintained while driving three points of the lens frame 12 independently.

However, with regard to the shake correcting direction, the planarity of the supporting portion 13 is maintained by the rolling balls 1508a to 1508c at three points. Therefore, the requirement of the sensitivities of the shake detectors 1505a and 1505b is not so strict. Therefore, in the present embodiment, the sensitivity calibration in the shake correcting direction is not performed. The present invention is not limited to this, but the calibration of the sensitivity may also be performed by providing a limiting member, similarly to the AF.

When the calibrations of the optical axis direction position detectors 19a to 19c are performed, the lens frame 12 is preferably positioned at an optical axis center. When the lens frame 12 is positioned on the periphery at the calibration time, the variation of reference positions of the optical axis direction movement limiting members 13d to 13f and the movement limiting pins 12d to 12f at every position influences the calibration accuracy. The variation of the facing distance between the optical axis direction position detectors 19a to 19c and the indexes 115a to 115c at every position also influences the calibration accuracy. Therefore, at the calibration time, it is important to stably arrange the lens frame 12 so as to be always at the same position in a plane orthogonal to the optical axis.

Figure 19:
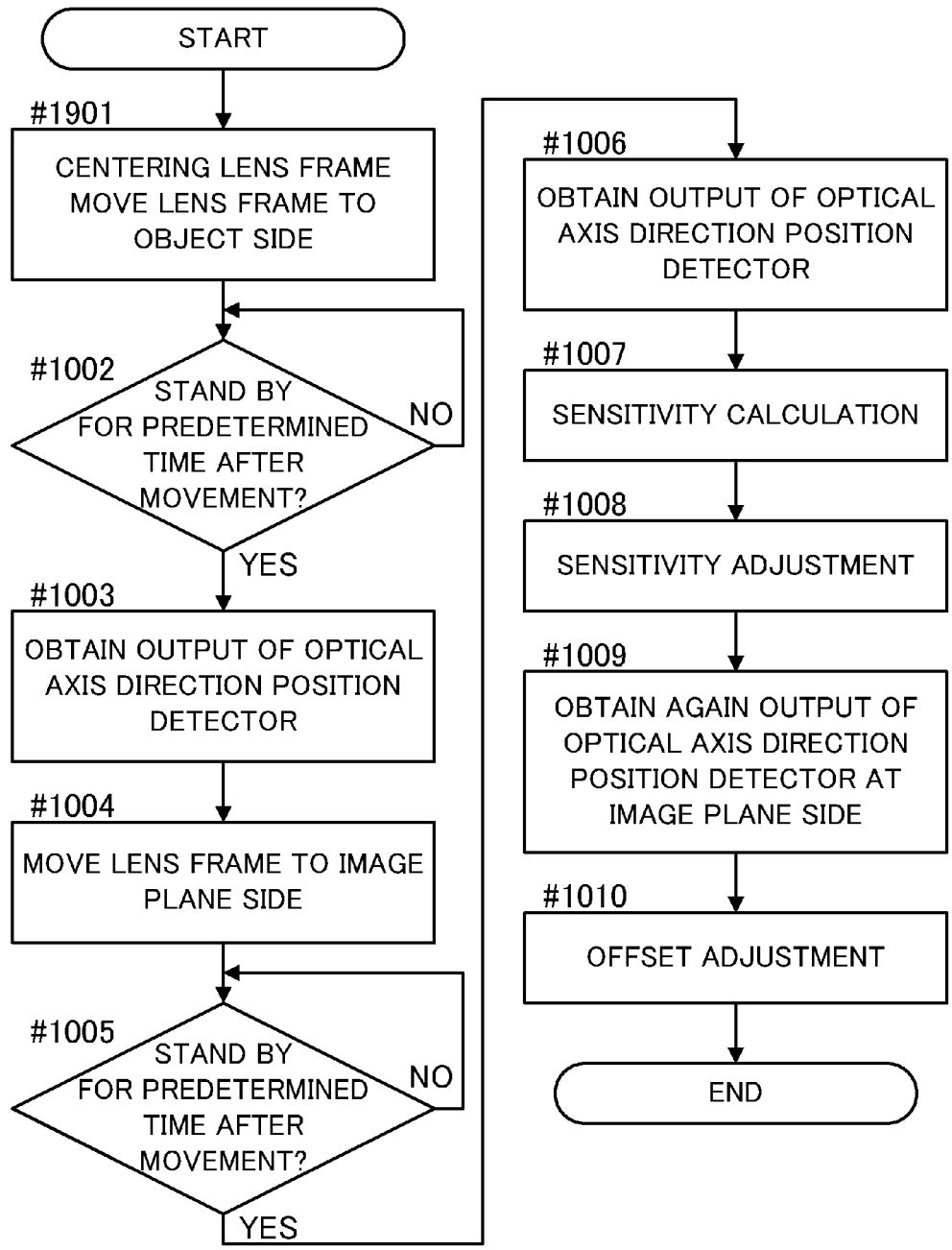
FIG. 19 is a flowchart describing a motion of an optical apparatus in embodiment 2.

FIG. 19 is a flowchart describing the operation of the optical apparatus in embodiment 2. The flowchart of FIG. 19 is basically the same as that of embodiment 1 shown in FIG. 14. However, FIG. 19 is different from FIG. 14 in that Step #1901 is provided instead of Step #1001 of FIG. 14.

In Step #1901, after centering the lens frame 12, the lens CPU 1204 moves the lens frame 12 to the object side to contact the optical axis direction movement limiting members 13d to 13f and the movement limiting pins 12d to 12f. Thus, in the present embodiment, the flow of the calibration is performed after the lens frame 12 is always positioned at the same place in a plane orthogonal to the optical axis. When the lens frame 12 moves to the object side, all of the three optical axis direction drivers (coils 17a to 17c) are driven in the same phase direction to contact the three points with the optical axis direction movement limiting members 13d to 13f at the same time. Therefore, the lens frame 12 can easily ensure its planarity.

Next, in Step #1002, the lens CPU 1204 stands by until the movement of the lens frame 12 is completed and the mechanical transient response (shake) vanishes. In Step #1003, the outputs of the optical axis direction position detectors 19a to 19c at this position are obtained. In Step #1004, the lens CPU 1204 applies the electric current to the coils 17a to 17c to move the lens frame 12 to the image plane side. In this case, the lens frame 12 contacts the three optical axis direction position limiting members at the same time by driving all of the three optical axis direction drivers (coils 17a to 17c) in the same phase direction. Therefore, the lens frame 12 can easily ensure the planarity.

In Step #1005, the lens CPU 1204 stands by until the movement of the lens frame 12 is completed and the mechanical transient response (shake) vanishes. In Step #1006, the outputs of the optical axis direction position detectors 19a to 19c at this position are obtained. After this, also, the lens frame 12 is biased to a limiting position at the image plane side for a while.

In Step #1007, based on the outputs of the optical axis direction position detectors 19a to 19c obtained in Step #1003 and Step #1006, the sensitivities 519a to 519c of the optical axis direction position detectors 19a to 19c, respectively, are obtained.

In Step #1008, the obtained sensitivities 519a to 519c are compared with the reference sensitivity S0. Further, the sensitivity adjusting portions 1204d to 1204f perform sensitivity changes of the sensitivity changing devices 1301a to 1301c so that the sensitivities of the optical axis direction position detectors 19a to 19c are set to be the reference sensitivity S0.

Subsequently, in Step #1009, the outputs of the optical axis direction position detectors 19a to 19c at the image plane side limiting positions are obtained again. It is because the previously obtained output voltages Vs19ai to Vs10ci may be changed in accordance with the change of the sensitivity.

In Step #1010, the offset adjustment is performed so that the output voltages of the optical axis direction position detectors 19a to 19c obtained in Step #1009 are set to be the reference output V0, and this flow is finished.

As described above, embodiment 2 has described that the shake correction is performed by driving the supporting portion 13 in the direction orthogonal to the optical axis. However, for the purpose of the correction in the case where the lens frame 12 is displaced with respect to a center in a plane in the direction orthogonal to the optical axis due to the variation of the elastic devices 14a to 14c, or the like, instead of the purpose of performing the shake correction, the supporting portion 13 may be driven in the direction orthogonal to the optical axis.

As described above, in the present embodiment, a position of the lens in the optical axis direction is detected at (at least) three areas. Based on the detected result, the drive control of the optical axis direction driver which is corresponding one of the optical axis direction position detectors is independently performed to be able to stably perform a focusing without generating a tilt of the lens.

Particularly in the present embodiment, in addition to the configuration of embodiment 1, the base plate portions (the fixed portions 1509 and 1510) which support the supporting portion 13 so as to be movable in the direction orthogonal to the optical axis with respect to the barrel are provided on the lens barrel 1201. The base plate portions are provided on the barrel and support the supporting portion 13 so as to be movable in the direction orthogonal to the optical axis direction.

The optical apparatus of the present embodiment includes a first driver (shake correcting coils 1502a and 1502b) which drives the supporting portion 13 in the direction perpendicular to the optical axis with respect to the lens barrel 1201. Thus, the first driver drives the supporting portion 13 in the direction orthogonal to the optical axis direction so as to correct the shake of an image based on the signal detected by the shake detector. Accordingly, in the optical apparatus of the present embodiment, the lens frame 12 is configured to be movable in the optical axis direction and also the direction orthogonal to the optical axis with respect to the lens barrel 1201.

Further, when performing a calibration of the optical axis direction position detector, in the direction orthogonal to the optical axis, the center of the lens held by the lens frame is arranged at substantially an optical axis position of the barrel to realize a high optical performance.

In such a configuration, according to the present embodiment, a lens drive for a high-speed and silent focusing is possible in a state where the lens is stably held without generating a tilt of the lens, and the optical apparatus capable of correcting the shake can be realized.

The lens frame 12 of the present embodiment is configured to be movable in the direction orthogonal to the optical axis so as to correct the shake of an image, but is not limited to this. The lens frame 12 may be configured to be movable in a direction different from the optical axis direction so as to correct the shake of the image. In this case, the first driver drives the supporting portion 13 in the direction different from the optical axis direction, and the base plate portion supports the supporting portion 13 so as to be movable in the direction different from the optical axis direction. When the calibration portion calibrates the sensitivity, the first driver drives the supporting portion 13 in the direction different from the optical axis direction, and the center of the focus correction lens 11a is aligned at an optical axis position of the barrel.

[Embodiment 3]

Next, embodiment 3 of the present invention will be described. In the present embodiment, the same descriptions as those of embodiment 1 and 2 will be omitted.

Figure 20:
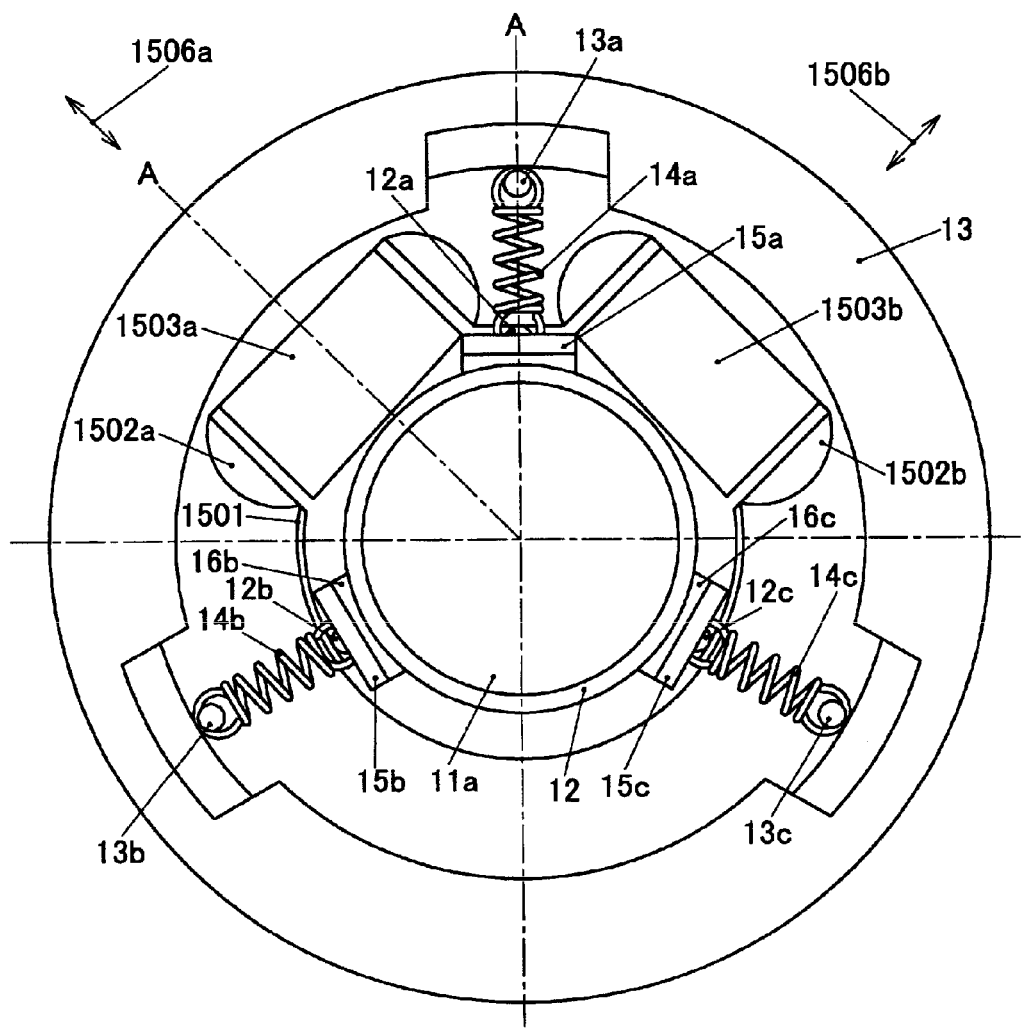
FIG. 20 is a plan view of an optical apparatus in embodiment 3.
Figure 21:
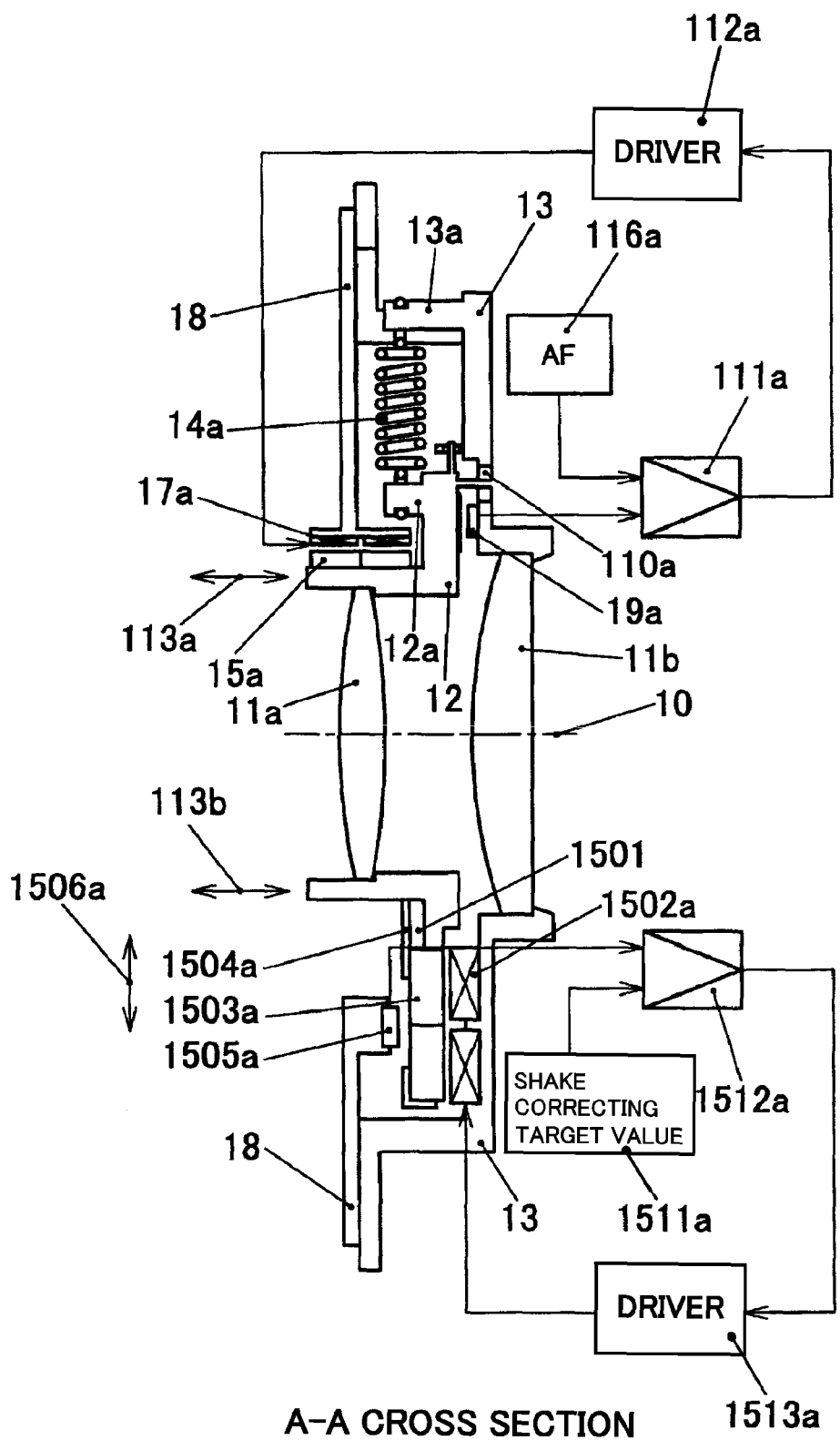
FIG. 21 is a cross-sectional view of an optical apparatus in embodiment 3.

FIG. 20 is a plan view of an optical apparatus of the present embodiment. FIG. 21 is a cross-sectional view of A-A section in FIG. 20. The optical apparatus of the present embodiment is different from that of embodiment 1 in that the lens frame 12 is not only driven in an optical axis direction (a direction indicated by arrows 113a and 113b) but also driven in a direction orthogonal to the optical axis direction (directions indicated by arrows 1506a and 1506b). Further, the present embodiment is different from embodiment 2 in that the lens frame 12 of the present embodiment is driven in the direction orthogonal to the optical axis while the supporting portion 13 of embodiment 2 is driven in the direction orthogonal to the optical axis.

As shown in FIGS. 20 and 21, the lens frame 12 is provided with the shake correcting coils 1502a and 1502b. The coil holder 18 is provided with the shake correcting permanent magnets 1503a and 1503b so as to face the shake correcting coils 1502a and 1502b, respectively. The coil holder 18 of the present embodiment is integrally formed while the coil holder 18 of embodiment 1 has been divided into three parts as coil holders 18a to 18c, each of which is fixed on the supporting portion 13.

Figure 22:
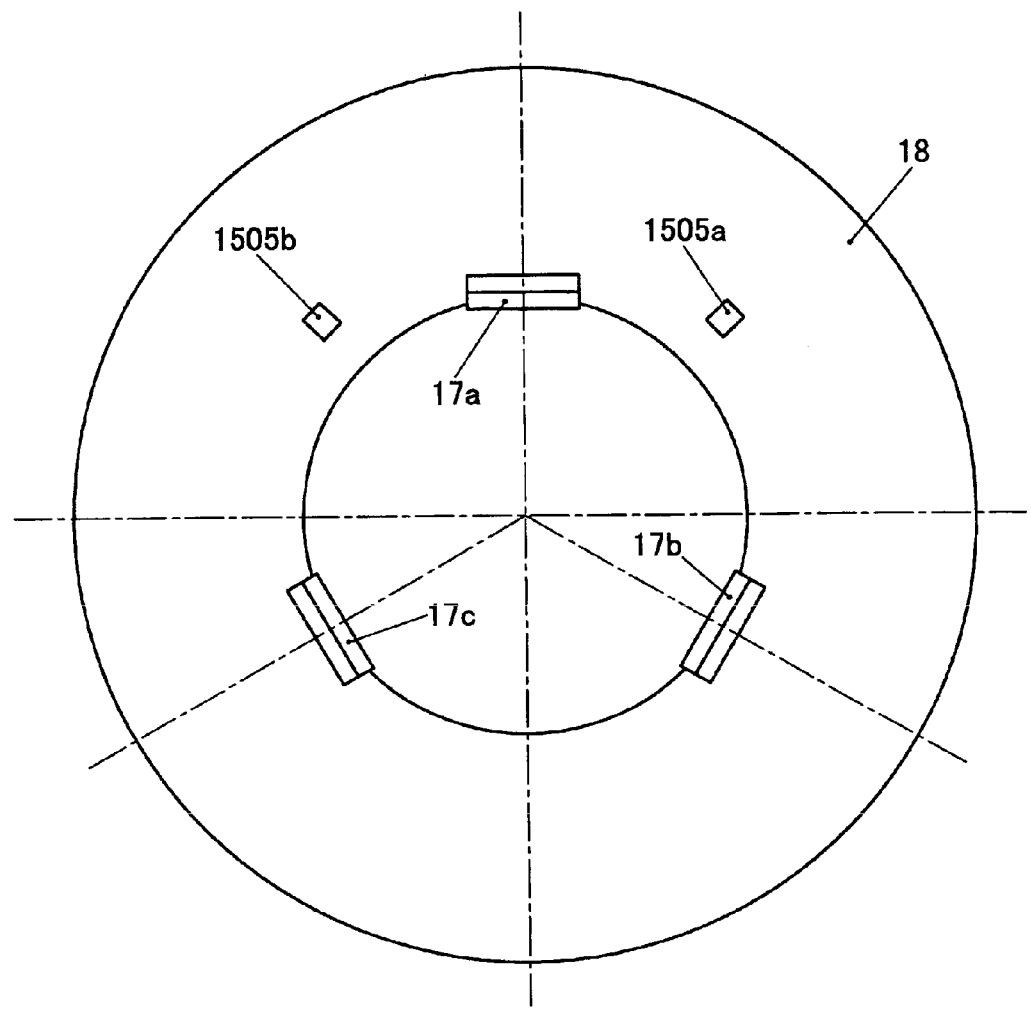
FIG. 22 is a plan view showing a back surface of a coil holder in an optical apparatus in embodiment 3.

FIG. 22 is a plan view showing a back surface (a surface when viewed from the right side of FIG. 21) of the coil holder in the optical apparatus in the present embodiment.

The coil holder 18 is provided with shake correcting permanent magnets 1503a and 1503b (not shown) as well as the coils 17a to 17c. Similarly to embodiment 1, the lens frame 12 is elastically supported by the elastic devices 14a to 14c, and a shake is damped by the damper (damper members 110a to 110c and damper pins 12d to 12f).

In the embodiment, the damper pins 12d to 12f are, as described in embodiment 1, not only moved in the optical axis direction, but also moved in the direction orthogonal to the optical axis. Therefore, the damper members 110a to 110c receive compression forces and tension forces not only in the optical axis direction but also in the direction orthogonal to the optical axis. Accordingly, the damper generates a damping effect in both directions of the optical axis direction (a focusing direction) and the direction orthogonal to the optical axis (a shake correcting direction).

The lens frame 12 is driven in directions indicated by arrows 1506a and 1506b with respect to the supporting portion 13 (fixed portion) by applying electric current to the shake correcting coils 1502a and 1502b. As shown in FIGS. 21 and 22, the coil holder 18 is provided with the shake detectors 1505a and 1505b, each of which includes a magnetic detection sensor such as a hall element. The shake detectors 1505a and 1505b detect displacement of the lens frame 12 in directions indicated by arrows 1506a and 1506b with respect to the facing shake correcting permanent magnets 1503a and 1503b, respectively.

In the present embodiment, the shake detectors 1505a and 1505b detect the displacement of the lens frame 12 with respect to the coil holder 18 and the supporting portion 13 (the coil holder 18 and the supporting portion 13 are fixed to each other). The lens CPU 1204 controls the electric current applied to the shake correcting coils 1502a and 1502b based on the displacement detection result. Thus, the optical apparatus of the present embodiment is able to drive the lens frame 12 in the directions indicated by the arrows 1506a and 1506b with high accuracy.

Specifically, as shown in FIG. 21, the output of the shake detector 1505a is inputted to the comparator 1512a. The comparator 1512a compares the output value with the shake correcting target value 1511a. The driving portion 1513a controls the electric current applied to the shake correcting coil 1502a based on the comparison result by the comparator 1512a. Although each operation of the comparator 1512a and the driving portion 1513a is actually processed by the lens CPU 1204, the details of this will be described later. Similarly, the driving portion 1513b (not shown) controls the electric current applied to the shake correcting coil 1502b.

Such a configuration enables the optical apparatus of the present embodiment to drive the lens frame 12 in the optical axis direction and the direction orthogonal to the optical axis and to perform a focusing and a shake correction with high accuracy.

Figure 23:
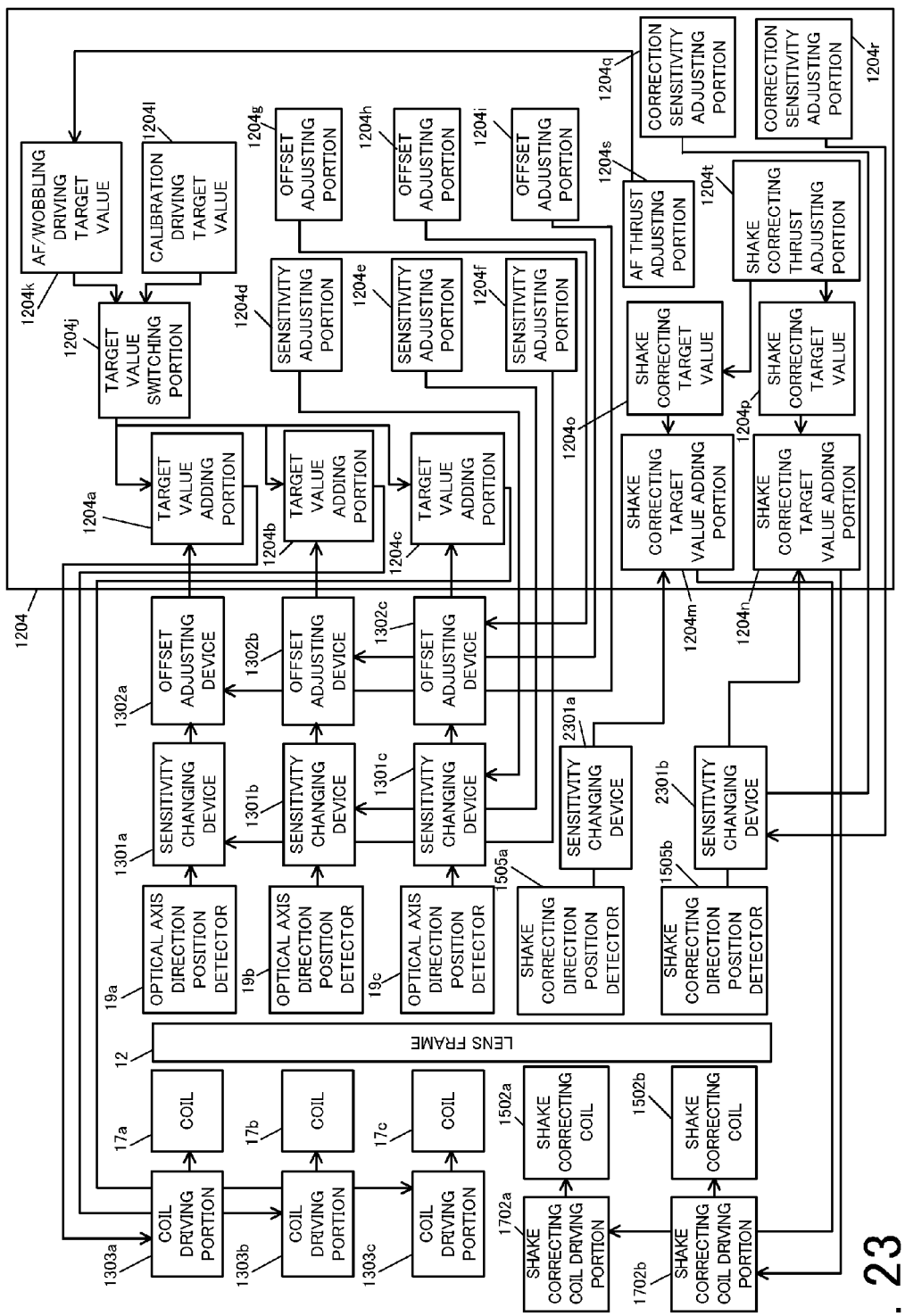
FIG. 23 is a block diagram of an optical apparatus in embodiment 3.

FIG. 23 is a block diagram of the optical apparatus in the present embodiment. The present embodiment is different from embodiment 2 (see FIG. 18) in that, first of all, sensitivity changing devices 2301a and 2301b are provided. Further, the present embodiment is different from embodiment 2 in that correction sensitivity adjusting portions 1204q and 1204r, an AF thrust adjusting portion 1204s, and a shake correcting thrust adjusting portion 1204t are provided in the lens CPU 1204.

Hereinafter, each role of the sensitivity changing devices 2301a and 2301b, the correction sensitivity adjusting portions 1204q and 1204r, the AF thrust adjusting portion 1204s, and the shake correcting thrust adjusting portion 1204t will be described.

As shown in FIG. 21, when the lens frame 12 moves in the optical axis direction (a direction indicated by arrows 113a and 113b), a distance (a facing gap) between the shake correcting coil 1502a (1502b) and the shake correcting permanent magnet 1503a (1503b) is changed.

Generally, when the gap between a permanent magnet and a coil which face each other is changed, the generated thrust is changed. Therefore, the movement of the lens frame 12 in the optical axis direction causes the change of the thrust force in the shake correcting directions (directions indicated by the arrows 1506a and 1506b). In order to correct this change, the shake correcting thrust adjusting portion 1204t provides the adjusted value to the shake correcting target value 1204o, in accordance with the position of the lens frame 12 in the optical axis direction. For example, when the lens frame 12 moves in the optical axis direction to widen the facing gap between the shake correcting coil 1502a and the shake correcting permanent magnet 1503a, a predetermined coefficient is multiplied to the shake correcting target value 1204o to provide a larger amount of electric current to the shake correcting coil 1502a.

As described above, in the shake correcting direction, the shake correcting coil 1502a receives negative feedback by the shake detector 1505a. Therefore, the variation of the thrust force is reduced by a loop gain of the negative feedback. However, when a large loop gain is not provided, the variation of the thrust force can not be absorbed only by the loop gain. Therefore, in the present embodiment, predicting the variation of the thrust force in advance, the driving target value for the shake correction is changed by the variation to reduce the thrust variation.

When the lens frame 12 moves in the optical axis direction, the distance (the facing gap) between the shake correcting permanent magnet 1503a (1503b) and the shake detector 1505a (1505b) is changed. Due to the influence of the change of the distance, the magnetic flux of the shake correcting permanent magnet 1503a, which is applied to the shake detector 1505a, is changed and its sensitivity is changed.

The correction sensitivity adjusting portions 1204a and 1204b predict the sensitivity change based on a position of the lens frame 12 in the optical axis direction. They change gain sensitivities of the sensitivity changing devices 2301a and 2301b to correct the sensitivity change of the shake detectors 1505a and 1505b.

It is the same for the case where the lens frame 12 moves in the shake correcting direction. As shown in FIG. 20, when the lens frame 12 moves in the shake correcting direction, the distances (facing gaps) between the coils 17a to 17c and the permanent magnets 15a to 15c, respectively, are changed. Therefore, the driving thrust forces of three driving portions in the optical axis direction are unbalanced.

In order to avoid this, the AF thrust adjusting portion 1204s multiplies a correction value which corresponds to each of the coils 17a to 17c to a driving target value (AF/wobbling driving target value 1204k) in the optical axis direction, in accordance with the position of the lens frame 12 in the shake correcting direction. Specifically, when a driving amount of the lens frame 12 in the direction orthogonal to the optical axis is large and the gaps between the coils 17a to 17c and the permanent magnets 15a to 15c are widened, the driving target value is changed so that the driving force of the driving portion in the optical axis direction increases.

With regard to the optical axis direction position detectors 19a to 19c, because a facing gap with respect to corresponding one of the indexes 115a to 115c does not change even if the lens frame 12 changes its position in the shake correcting direction, there is no sensitivity change and the correction of the sensitivity is not performed.

Figure 24:
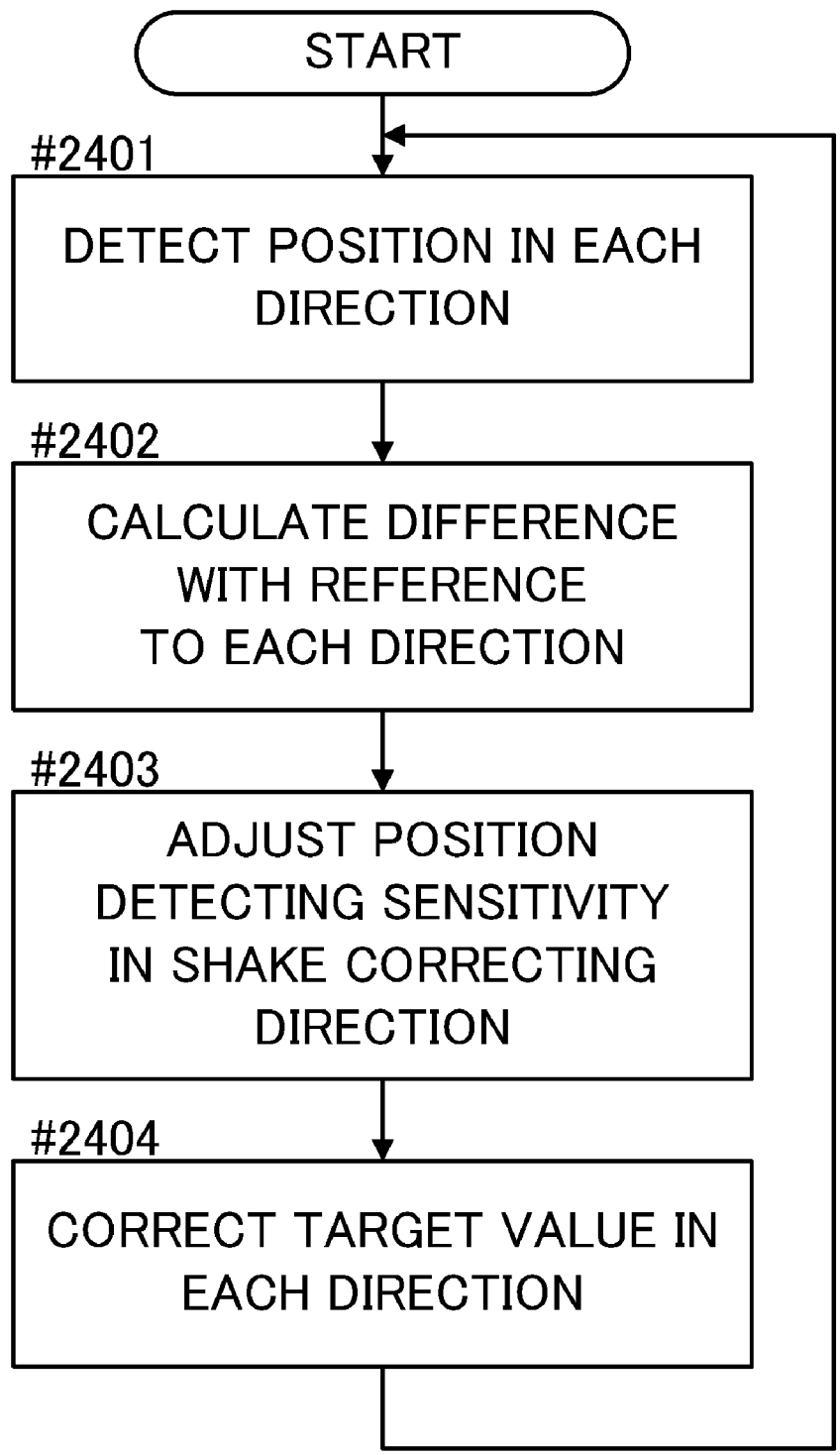
FIG. 24 is a flowchart describing a motion of an optical apparatus in embodiment 3.

FIG. 24 is a flowchart describing the operation of the optical apparatus in the present embodiment. The flow shown in FIG. 24 starts at the driving time of the lens frame 12 in the optical axis direction and the shake correcting direction, and is finished by stopping the drive.

First, in Step #2401, the position of the lens frame 12 in each direction of the optical axis direction (direction indicated by arrows 113a and 113b) and the shake correcting directions (directions indicated by arrows 1506a and 1506b) is detected.

Next, in Step #2402, the difference between a reference position and a current position is calculated, and in accordance with the difference, a thrust adjusting value in an AF direction, a thrust adjusting value in the shake correcting direction, and a position detecting sensitivity correction value in the shake correcting direction are obtained. The reference position is, for example, a position where the lens frame 12 moves to a maximum of the optical axis direction image plane side and the optical axis direction movement limiting members 13d to 13f contact the movement limiting pins 12d to 12f of the lens frame 12 and is also a center position of the lens frame 12 in the shake correcting direction.

In Step #2403, based on the correction value obtained in Step #2402, the position detecting sensitivity in the shake correcting direction is adjusted. Subsequently, in Step #2404, based on the adjusted value obtained in Step #2402, each target value is corrected so that the changes of the driving thrust force of each driver in the optical axis direction and in the shake correcting direction are complemented. After each target value is corrected, the flow returns to Step #2401.

Such a flow enables the optical apparatus of the present embodiment to stably drive the lens frame 12 even if the lens frame 12 arbitrary moves in the optical axis direction and the shake correcting direction. Similarly to embodiment 2, the present embodiment is also able to perform a highly accurate calibration by positioning the lens frame 12 at a center when calibrating output signals of the optical axis direction position detectors 19a to 19c.

In addition to embodiment 1, a second driver (shake correcting coils 1502a and 1502b, and shake correcting permanent magnets 1503a and 1503b) which drives the lens frame 12 in the direction orthogonal to the optical axis is provided on the lens frame 12. The lens frame 12 is driven in the optical axis direction and the direction orthogonal to the optical axis with respect to the barrel against the elastic forces of the tension coil springs (the elastic devices 14a to 14c) by the driving forces of the optical axis direction driver (coils 17a to 17c, and permanent magnets 15a to 15c).

The lens frame 12 of the present embodiment is configured to be movable in the direction orthogonal to the optical axis so as to correct the shake of an image, but is not limited to this. The lens frame 12 may be configured to be movable in a direction different from the optical axis direction so as to correct the shake of the image. In this case, the second driver drives the lens frame 12 in the direction different from the optical axis direction so as to correct the shake of the image based on the signal detected by the shake detector. Thus, the lens frame 12 is also movable in the direction different from the optical axis direction with respect to the barrel against the elastic force of the elastic supporting portion by the driving force of the second driver.

When the calibration portion calibrates the sensitivity, the second driver drives the lens frame 12 in the direction different from the optical axis direction to align the center of the focus correction lens 11a to an optical axis position of the barrel. Thus, when the output signals of the optical axis direction position detectors 19a to 19c are calibrated, the center of the lens held by the lens frame is arranged at substantially the optical axis position of the barrel in the direction orthogonal to the optical axis. Therefore, according to the optical apparatus of the present embodiment, high optical performance can be realized.

The optical apparatus of the present embodiment is provided with a first driving target value changing portion (AF thrust adjusting portion 1204s) which changes a driving target value in the optical axis direction, in accordance with a driving amount in the direction orthogonal to the optical axis (in the direction different from the optical axis) of the lens frame, in order to prevent driving interference. The first driving target value changing portion changes the driving target value so as to increase the driving force in the optical axis direction when the driving amount of the lens frame in the direction different from the optical axis increases.

Further, the optical apparatus of the present embodiment includes a second driving target value changing portion (shake correcting thrust adjusting portion 1204t) which changes a driving target value in the direction orthogonal to the optical axis (in the direction different from the optical axis) in accordance with the driving amount in the optical axis direction of the lens frame. The second driving target value changing portion changes the driving target value so as to increase the driving force in the direction different from the optical axis direction when the driving amount of the lens frame in the optical axis direction increases.

[Embodiment 4]

Figure 25:
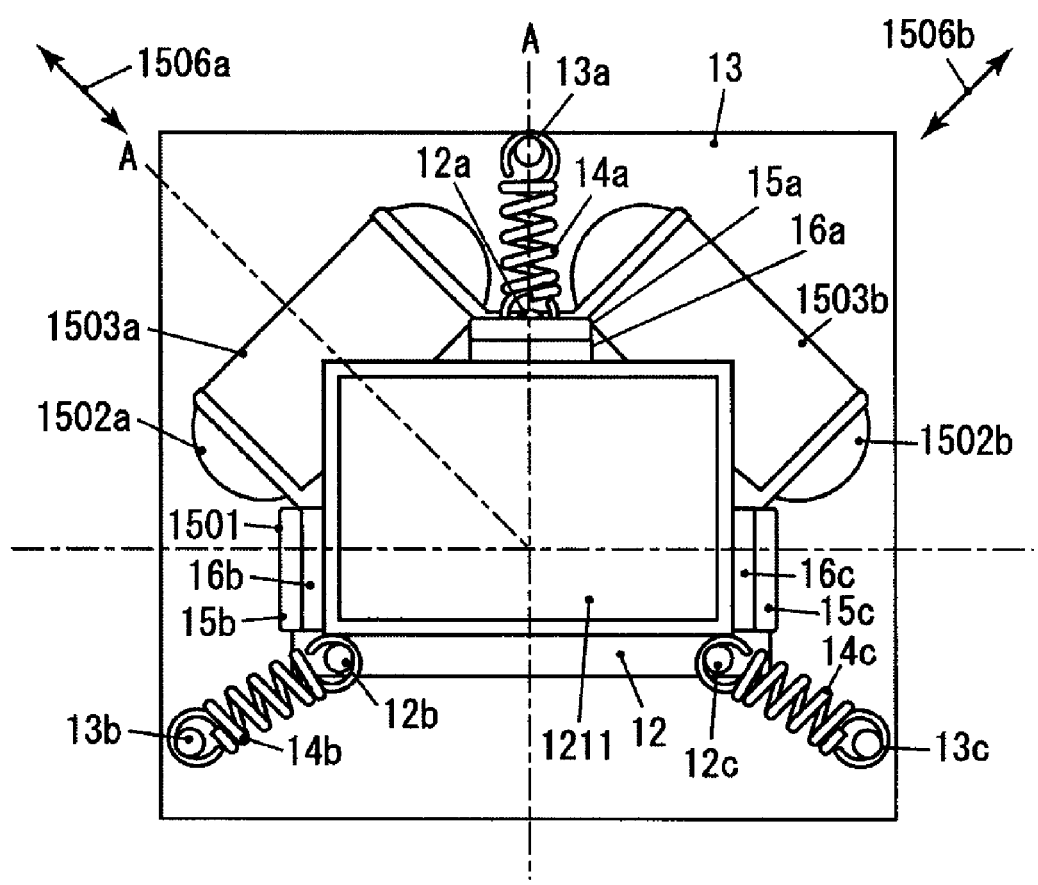
FIG. 25 is a plan view of an optical apparatus in embodiment 4.
Figure 26:
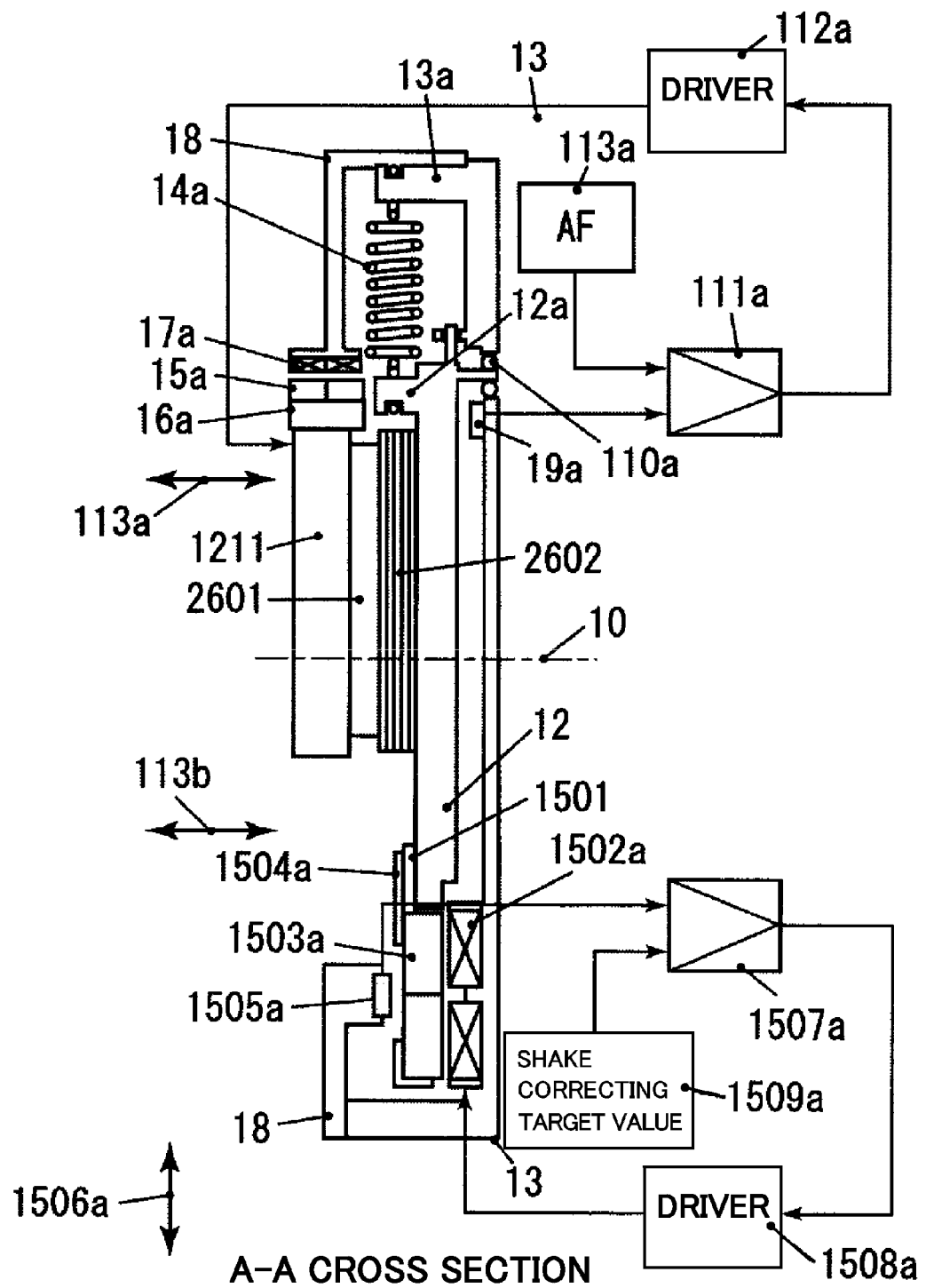
FIG. 26 is a cross-sectional view of an optical apparatus in embodiment 4.

FIGS. 25 and 26 are an elevation view and a cross-sectional view of A-A section of the elevation view in embodiment 4 of the present invention, respectively.

Embodiment 4 is different from embodiment 3 in that the image pickup element 1211 is provided on the holding frame 12 that is a moving frame, instead of the focus correction lens 11a. Further, it is different in that an arranging direction of the coils 17b and 17c (not shown), the permanent magnets 15b and 15c, the yokes 16b and 16c are along a side of the image pickup element 1211. Therefore, each functional component is denoted by the same reference numeral as that of embodiment 3, and its description is omitted.

The supporting portion 13 is provided on the camera body 1208 instead of the lens barrel 1201, and the object image passed through the lens barrel 1201 is imaged on the image pickup element 1211 of the camera body 1208.

The basic operation is the same as that of embodiment 3, and the image pickup element 1211 is driven in an optical axis direction 113 to perform a focusing or a wobbling and it is driven in a direction orthogonal to the optical axis 1506 to perform a shake correction.

In FIG. 26, an electronic cooling element 2601 such as a Peltier element, and a heatsink 2602 are provided on a back surface of the image pickup element 1211, which absorb heat generated by the image pickup element 1211 to radiate it to the environment.

Thus, the present invention is also applicable to the driving of the image pickup element instead of the lens, and is capable of performing a high-speed and silent focusing or wobbling.

As described above, in the present embodiment, the position of the moving frame (lens frame, or holding frame) in the optical axis direction is detected at (at least) three areas, and based on the result, a drive control of each optical axis direction driver which corresponds to one of the optical axis direction position detectors is independently performed. A stable focusing can be performed without generating a tilt of the lens or the image pickup element by such a configuration.

In each of the above embodiments, a single-lens reflex camera has been described as one example of an optical apparatus, but the present invention is not limited to this. According to each of the above embodiments, a high-speed and silent optical apparatus can be realized, and the present invention is also applicable to a compact camera, a video camera, a monitoring camera, a web camera, a cell-phone, or the like.

According to each of the above embodiments, an optical apparatus capable of performing a high-speed and silent focusing in a state where a lens is stably held without generating a tilt of the lens or an image pickup element can be provided. Further, it is also configured to stably perform a shake correction at the same time. According to each of the above embodiments, an optical apparatus capable of stably realizing a high-speed lens drive can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-251673, filed on Sep. 29, 2008, which is hereby incorporated by reference herein in its entirety.

What is claimed is:

1. An optical apparatus comprising:
a moving frame configured to hold one of a lens and an image pickup device and to be movable in an imaging optical axis direction;
a plurality of detectors arranged at one of the moving frame and a fixed portion inside an imaging apparatus and configured to detect signals in accordance with a distance to the other one, each of the plurality of detectors being configured to detect a displacement in the imaging optical axis direction;
a plurality of drivers configured to drive the moving frame in the imaging optical axis direction;
an elastic supporting portion configured to elastically support the moving frame to the fixed portion;
a shake detector configured to detect a shake of the imaging apparatus; and
a second driver configured to drive the moving frame in a direction different from the imaging optical axis direction so as to correct a shake of an image based on a signal detected by the shake detector; and
a first driving target value changing portion configured to change a driving target value of the moving frame in the imaging optical axis direction in accordance with a driving amount of the moving frame in the direction different from the imaging optical axis direction,
wherein the moving frame is also movable in the direction different from the imaging optical axis direction with respect to the imaging apparatus against an elastic force of the elastic supporting portion by a driving force of the second driver; and
wherein when the driving amount of the moving frame in the direction different from the imaging optical axis direction increases, the first driving target value changing portion increases a driving force of the moving frame in the imaging optical axis direction.

2. An optical apparatus according to claim 1, further comprising a controller configured to control the plurality of drivers based on the signals detected by the plurality of detectors.

3. An optical apparatus according to claim 1, further comprising a calibration portion configured to calibrate each of sensitivities of the plurality of detectors to a predetermined sensitivity.

4. An optical apparatus according to claim 3, further comprising a movement limiting member having a movement limiting portion which limits an area between the moving frame and the fixed portion at both ends of the distance, and configured so that at least one of the lens and the image pickup device is orthogonal to the imaging optical axis direction in a state where the movement limiting portion limits movement of the moving frame,
wherein the calibration portion is configured to calibrate each of the sensitivities of the plurality of detectors to the predetermined sensitivity by limiting the movement of the moving frame at the both ends of the distance by the movement limiting portion.

5. An optical apparatus according to claim 4,
wherein when the distance limited by the movement limiting member is maximum, the calibration portion calibrates the sensitivity based on the signal detected by the detector.

6. An optical apparatus according to claim 1, further comprising a damper configured to damp a shake generated by the moving frame moving in the imaging optical axis direction,
wherein the damper is provided between the moving frame and the fixed portion.

7. An optical apparatus comprising:
a moving frame configured to hold one of a lens and an image pickup device and to be movable in an imaging optical axis direction;
a plurality of detectors arranged at one of the moving frame and a fixed portion inside an imaging apparatus and configured to detect signals in accordance with a distance to the other one, each of the plurality of detectors being configured to detect a displacement in the imaging optical axis direction;
a plurality of drivers configured to drive the moving frame in the imaging optical axis direction;
an elastic supporting portion configured to elastically support the moving frame to the fixed portion;
a shake detector configured to detect a shake of the imaging apparatus;
a second driver configured to drive the moving frame in a direction different from the imaging optical axis direction so as to correct a shake of an image based on a signal detected by the shake detector; and
a second driving target value changing portion configured to change a driving target value in the direction different from the imaging optical axis direction in accordance with the driving amount of the moving frame in the imaging optical axis direction,
wherein the moving frame is also movable in the direction different from the imaging optical axis direction with respect to the imaging apparatus against an elastic force of the elastic supporting portion by a driving force of the second driver; and
wherein when the driving amount of the moving frame in the imaging optical axis direction increases, the second driving target value changing portion increases a driving force in the direction different from the imaging optical axis direction.

8. An optical apparatus according to claim 7, further comprising a controller configured to control the plurality of drivers based on the signals detected by the plurality of detectors.

9. An optical apparatus according to claim 7, further comprising a calibration portion configured to calibrate each of sensitivities of the plurality of detectors to a predetermined sensitivity.

10. An optical apparatus according to claim 9, further comprising a movement limiting member having a movement limiting portion which limits an area between the moving frame and the fixed portion at both ends of the distance, and configured so that at least one of the lens and the image pickup device is orthogonal to the imaging optical axis direction in a state where the movement limiting portion limits movement of the moving frame,
wherein the calibration portion is configured to calibrate each of the sensitivities of the plurality of detectors to the predetermined sensitivity by limiting the movement of the moving frame at the both ends of the distance by the movement limiting portion.

11. An optical apparatus according to claim 10,
wherein when the distance limited by the movement limiting member is maximum, the calibration portion calibrates the sensitivity based on the signal detected by the detector.

12. An optical apparatus according to claim 7, further comprising a damper configured to damp a shake generated by the moving frame moving in the imaging optical axis direction,
wherein the damper is provided between the moving frame and the fixed portion.

* * * * *